United States Patent
Kocienda et al.

(10) Patent No.: US 12,407,900 B2
(45) Date of Patent: *Sep. 2, 2025

(54) GENERATING, STORING, AND PRESENTING CONTENT BASED ON A MEMORY METRIC

(71) Applicant: Hewlett-Packard Development Company, L.P., Spring, TX (US)

(72) Inventors: Kenneth Luke Kocienda, Mill Valley, CA (US); Imran A. Chaudhri, San Francisco, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,531

(22) Filed: Jan. 9, 2024

(65) Prior Publication Data

US 2024/0155194 A1 May 9, 2024

Related U.S. Application Data

(63) Continuation of application No. 17/687,494, filed on Mar. 4, 2022, now Pat. No. 11,895,368.

(51) Int. Cl.
*H04N 21/466* (2011.01)
*G06F 1/16* (2006.01)
(Continued)

(52) U.S. Cl.
CPC ......... *H04N 21/4667* (2013.01); *G06F 1/163* (2013.01); *G06F 3/015* (2013.01); *H04N 21/4126* (2013.01); *H04N 21/4415* (2013.01)

(58) Field of Classification Search
CPC ........... H04N 21/4667; H04N 21/4126; H04N 21/4415; G06F 1/163; G06F 3/015
See application file for complete search history.

(56) References Cited

U.S. PATENT DOCUMENTS 9,426,433 B1 8/2016 Mazzarella et al.
9,854,292 B1 12/2017 Matthews et al.
(Continued)

FOREIGN PATENT DOCUMENTS

| GB | 2577689 | 4/2020 |
|---|---|---|
| GB | 2582197 | 9/2020 |
| WO | WO 2020006189 | 1/2020 |

OTHER PUBLICATIONS

International Search Report and Written Opinion in International Appln. No. PCT/US2023/014483, mailed on Apr. 17, 2023, 12 pages.

(Continued)

*Primary Examiner* — Fernando Alcon
(74) *Attorney, Agent, or Firm* — Fish & Richardson P.C.

(57) ABSTRACT

Systems, methods, devices and non-transitory, computer-readable storage mediums are disclosed for a wearable multimedia device and cloud computing platform with an application ecosystem for processing multimedia data captured by the wearable multimedia device. In an embodiment, a wearable multimedia device obtains sensor data from one or more first sensors of the wearable multimedia device, and generates a first content item based on the sensor data. Further, the device obtains biometric data regarding a user of the device. The biometric data is obtained from one or more second sensors of the wearable multimedia device. The device determines a metric for the first content item based on the biometric data, and stores the first content item and the metric. The metric is stored as metadata of the first content item.

20 Claims, 18 Drawing Sheets

(51) Int. Cl.
*G06F 3/01* (2006.01)
*H04N 21/41* (2011.01)
*H04N 21/4415* (2011.01)

(56) References Cited

U.S. PATENT DOCUMENTS

| | | | |
|---|---|---|---|
| 9,894,266 B2* | 2/2018 | Andreassen | G11B 27/36 |
| 10,003,836 B2 | 6/2018 | Carmichael et al. | |
| 10,289,641 B2 | 5/2019 | Kudo et al. | |
| 10,481,749 B1 | 11/2019 | Alfishawi et al. | |
| 10,511,813 B1 | 12/2019 | Amstutz | |
| 10,529,379 B2 | 1/2020 | Chintalapoodi et al. | |
| 10,631,029 B1 | 4/2020 | Nijim et al. | |
| 11,049,147 B2 | 6/2021 | Chintalapoodi et al. | |
| 11,064,257 B2* | 7/2021 | Bist | H04N 21/23418 |
| 11,895,368 B2 | 2/2024 | Kocienda et al. | |
| 2005/0289582 A1 | 12/2005 | Tavares et al. | |
| 2009/0133047 A1 | 5/2009 | Lee et al. | |
| 2012/0290950 A1 | 11/2012 | Rapaport et al. | |
| 2013/0336545 A1 | 12/2013 | Pritikin et al. | |
| 2014/0157312 A1 | 6/2014 | Williams et al. | |
| 2015/0067708 A1 | 3/2015 | Jensen et al. | |
| 2015/0084984 A1 | 3/2015 | Tomii et al. | |
| 2015/0208023 A1* | 7/2015 | Boyle | G11B 27/034 386/278 |
| 2015/0318020 A1 | 11/2015 | Pribula | |
| 2016/0233946 A1 | 8/2016 | Wengrovitz et al. | |
| 2016/0253710 A1 | 9/2016 | Publicover et al. | |
| 2016/0316237 A1 | 10/2016 | Couleaud et al. | |
| 2016/0316238 A1* | 10/2016 | Carmichael | H04N 21/25891 |
| 2016/0360153 A1 | 12/2016 | Mazzarella et al. | |
| 2017/0006214 A1* | 1/2017 | Andreassen | G06V 40/10 |
| 2017/0118515 A1 | 4/2017 | Dey et al. | |
| 2017/0123487 A1 | 5/2017 | Hazra et al. | |
| 2017/0229149 A1* | 8/2017 | Rothschild | G16H 40/63 |
| 2018/0075490 A1 | 3/2018 | Chintalapoodi et al. | |
| 2018/0115802 A1 | 4/2018 | Knox | |
| 2018/0124308 A1 | 5/2018 | Andreassen et al. | |
| 2018/0184140 A1 | 6/2018 | Danker et al. | |
| 2018/0192108 A1 | 7/2018 | Lyons et al. | |
| 2018/0249218 A1 | 8/2018 | Sayman | |
| 2018/0309955 A1 | 10/2018 | Lawrence | |
| 2018/0310062 A1 | 10/2018 | Carnevale et al. | |
| 2019/0110103 A1 | 4/2019 | el Kaliouby et al. | |
| 2020/0104601 A1 | 4/2020 | Karoui et al. | |
| 2020/0236430 A1 | 7/2020 | Itzkowitz | |
| 2020/0288206 A1 | 9/2020 | Bist et al. | |
| 2021/0029391 A1 | 1/2021 | Choudhari et al. | |
| 2021/0044842 A1 | 2/2021 | Chauhan et al. | |
| 2021/0306694 A1 | 9/2021 | Yoo | |
| 2021/0400142 A1 | 12/2021 | Jorasch et al. | |
| 2022/0060666 A1 | 2/2022 | Lee | |
| 2022/0342482 A1 | 10/2022 | Lock et al. | |
| 2023/0047787 A1 | 2/2023 | Chappell, III et al. | |
| 2023/0283848 A1 | 9/2023 | Kocienda et al. | |

OTHER PUBLICATIONS

Kanel, "Sixth Sense Technology," Thesis for the Bachelor Degree of Engineering in Information and Technology, Centria University of Applied Sciences, May 2014, 46 pages.

Mann et al., "Telepointer: Hands-Free Completely Self Contained Wearable Visual Augmented Reality without Headwear and without any Infrastructural Reliance", IEEE Fourth International Symposium on Wearable Computers, Atlanta, GA, USA, Oct. 16-17, 2000, 4 pages.

Mann, "Wearable Computing: A First Step Toward Personal Imaging," IEEE Computer, Feb. 1997, 30(2):25-32.

Mann, "Wearable, tetherless computer-mediated reality," American Association of Artificial Intelligence Technical Report, Feb. 1996, 62-69, 8 pages.

Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.

Mistry et al., "WUW—wear Ur world: a wearable gestural interface", Proceedings of the 27th international conference Extended Abstracts on Human Factors in Computing Systems—CHI EA '09, Boston, MA, USA, Apr. 4-9, 2009, 6 pages.

Shetty et al., "Sixth Sense Technology," International Journal of Science and Research, Dec. 2014, 3(12):1068-1073.

International Preliminary Report on Patentability in International Appln. No. PCT/US2023/014483, mailed on Sep. 19, 2024, 10 pages.

* cited by examiner

| Streams | Users | Userdevices | Devices |
|---|---|---|---|
| streamid | userid | userid | deviceid |
| deviceid | deviceid | deviceid | started |
| start | email | | state |
| end | fname | | modified |
| lat | lname | | created |
| lon | | | |
| attributes | | | |
| entities | | | |

| ProcessingResults | Entities | EntityTypes | EntityAssociations |
|---|---|---|---|
| streamid | entityID | person | entity 1 |
| ai | userid | place | entity 2 |
| result | entityName | thing | |
| callback | entityType | event | |
| duration | entityAttribute | | |
| accuracy | | | |

FIG. 5

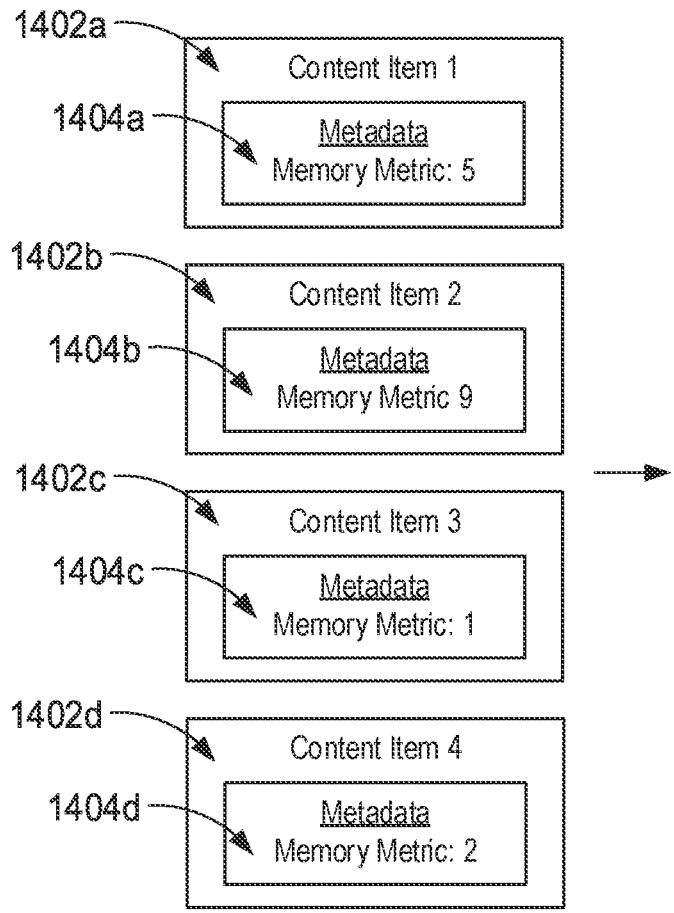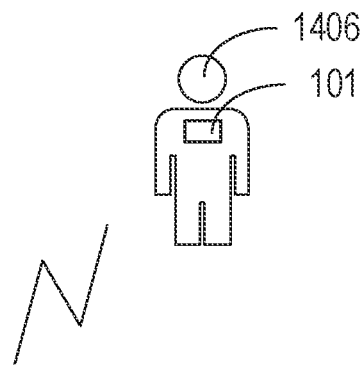
FIG. 14A

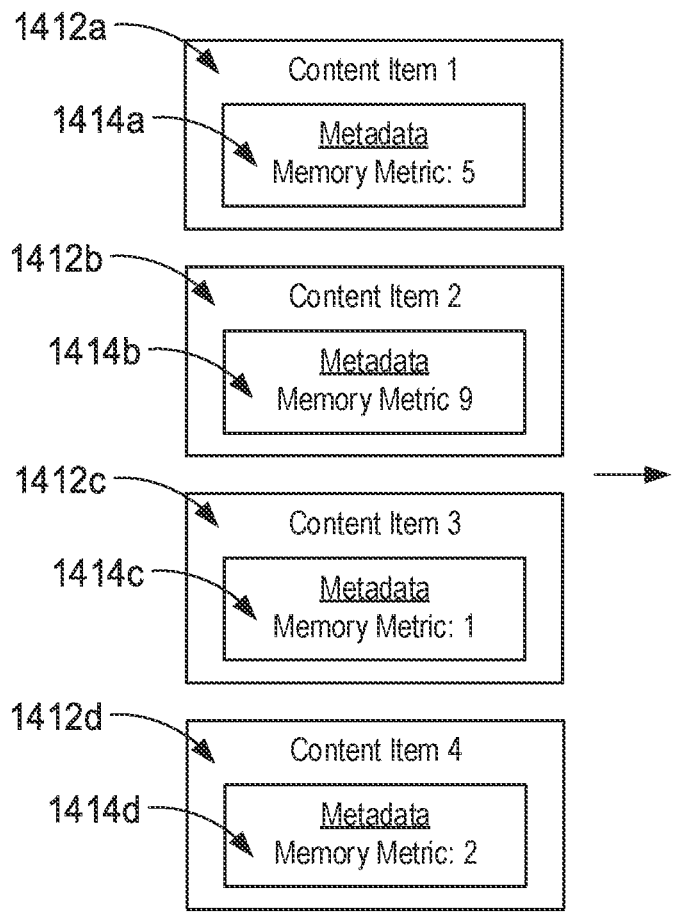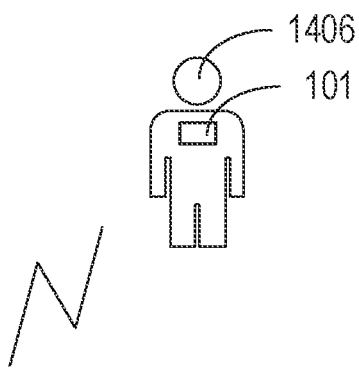
FIG. 14B

GENERATING, STORING, AND PRESENTING CONTENT BASED ON A MEMORY METRIC

CROSS-REFERENCE TO RELATED APPLICATION

This application is a continuation of, and claims priority to, U.S. patent application Ser. No. 17/687,494, filed Mar. 4, 2022, the entire contents of which are incorporated herein by reference.

TECHNICAL FIELD

This disclosure relates generally to generating, storing, and presenting content.

BACKGROUND

Modern mobile devices (e.g., smart phones, tablet computers) often include an embedded camera that allows a user to take digital images or videos of spontaneous events. These digital images and video can be stored in an online database associated with a user account to free up memory on the mobile device. Users can share their images and videos with friends and family, and download or stream the images and videos on demand using their various playback devices. These embedded cameras provide significant advantages over conventional digital cameras, which are bulky and often require more time to set-up a shot.

Despite the convenience of mobile device embedded cameras, there are many important moments that are not captured by these devices because the moments occur too quickly or the user simply forgets to take an image or video because they are emotionally caught up in the moment.

SUMMARY

Systems, methods, devices and non-transitory, computer-readable storage mediums are disclosed for a wearable multimedia device and cloud computing platform with an application ecosystem for processing multimedia data captured by the wearable multimedia device.

In general, a wearable multimedia device can capture multimedia data of spontaneous moments and transactions with minimal interaction by the user. Further, the wearable multimedia device can automatically edit and format the multimedia data on a cloud computing platform based on user preferences, and make the multimedia data available to the user for replay on a variety of user playback devices. In some implementations, the data editing and/or processing can be performed by an ecosystem of applications that are proprietary and/or provided/licensed from third party developers. Further, the application ecosystem can provide various access points (e.g., a website, portal, API) that allow the third party developers to upload, verify and update their applications. Further, the cloud computing platform can automatically build a custom processing pipeline for each multimedia data stream using one or more of the ecosystem applications, user preferences and other information (e.g., the type or format of the data, the quantity and quality of the data).

Additionally, the wearable multimedia device can include one or more cameras and/or depth sensor configured to detect objects and/or gestures performed by the user (e.g., using the user's hands), and perform or infer various actions based on the detections. As an example, based on the detections, the wearable multimedia device can label objects in camera images, control the operation of the wearable multimedia device, and/or control the operation of other devices communicatively coupled to the wearable multimedia device.

Further, in some implementations, the wearable multimedia device does not include a display, thereby allowing the user to continue interacting with friends, family, and co-workers without being immersed in a display. As such, the wearable multimedia device takes a different technical approach than, for example, smart goggles or glasses for augmented reality (AR) and virtual reality (VR), where the user is further detached from the real-world environment. To facilitate collaboration with others and to compensate for no display, the wearable multimedia computer can include a laser projection system that projects a laser projection onto any surface, including tables, walls and even the user's palm. The laser projection can label objects, provide text or instructions related to the objects, and provide a virtual interface (VI) that allows the user to compose messages, control other devices, or simply share and discuss content with others.

For instance, the wearable device can include a projector subsystem configured to present information visually to a user in the form of projected light. As an example, the projector subsystem can project light onto a surface (e.g., a surface of a user's hand, such as the user's palm) according to a particular spatial and/or temporal pattern, such that the user perceives a VI with one or more user interface elements. Further, the user can perform gestures to interact with the VI.

In some implementations, the wearable multimedia device can generate multimedia data, estimate the importance of that multimedia data to one or more users, and store an indication of the estimated importance alongside the multimedia data (e.g., in the form of metadata). As an example, the wearable multimedia device can generate a content item having images, text, video, audio, or any combination thereof. Further, based on characteristics of the content item and/or a user (e.g., the user who was wearing the wearable multimedia device during the generation of the content), the wearable multimedia device can determine a metric representing an estimated importance of that content item to the user. In some implementations, the metric can represent, at least in part, an estimated strength of the user's memory with respect to the subject matter of the content item and/or the estimated degree of emotional impact of the subject matter of the content item to the user. In some implementations, the metric may be referred to as a "memory metric" or a "memory strength metric."

Further, the wearable multimedia device can store the memory metric with the content item (e.g., as metadata of the content item), and use the memory metric when subsequently presenting the content item to the user. As an example, when presenting content to a user, the wearable multimedia device can prioritize the presentation of content items having a higher memory metric (e.g., indicating that those content items are more likely to be of importance to the user), and deprioritize the presentation of content items having a lower memory metric (e.g., indicating that those content items are less likely to be of importance to the user).

In some implementations, the memory metrics can be determined, at least in part, based on biometric data and/or location data. For example, the wearable multimedia device can capture sensor data (e.g., from one or more cameras, depth sensors, microphone, etc.), and incorporate at least some of the sensor data into a content item. Further, concurrently with capturing of the sensor data, the wearable multimedia device can capture biometric data regarding the user, such as the user's heartrate, respiration rate, perspiration rate, body temperature, etc. Further, the wearable multimedia device can capture location data regarding the user, such as the user's current location and/or historical locations. Based on the biometric data and/or the location data, the wearable multimedia device can estimate an emotional state of the user during the capturing of the sensor data, and estimate the degree of importance of the subject matter of the content item to the user.

The implementations described herein can provide various technical benefits. For instance, these techniques allow a wearable multimedia device to identify content items that are more likely to be relevant to a user (e.g., content items having subject matter that is of greater importance to the user and/or having a greater emotional impact on the user), and prioritize the presentation of those content items to the user over other content items. Accordingly, the user is less likely to browse through other content items (e.g., content items having subject matter that is of lesser importance to the user and/or having a lesser emotional impact on the user) when searching for content items of interest.

Further, these techniques can reduce the resources expended by the wearable multimedia device during operation. For instance, absent these techniques, a user may have difficulty identifying content items of interest, and may interact with the wearable multimedia device for an extended period of time while performing a search for relevant content items. Thus, the wearable multimedia device may expend resources—such as computational resources (e.g., CPU cycles), memory resources, storage resources, network resources, and/or battery resources—that might otherwise not need to be expended. By prioritizing the presentation of certain content items over others (e.g., in accordance with one or more memory metrics), the wearable multimedia device can reduce the expenditure of resources and operate in a more efficient manner.

In at least some embodiments, a method includes: obtaining, by a wearable multimedia device, sensor data from one or more first sensors of the wearable multimedia device; generating, by the wearable multimedia device, a first content item based on the sensor data; obtaining, by the wearable multimedia device, biometric data regarding a user of the wearable multimedia device, where the biometric data is obtained from one or more second sensors of the wearable multimedia device; determining, by the wearable multimedia device, a metric for the first content item based on the biometric data; and storing, by the wearable multimedia device, the first content item and the metric, where the metric is stored as metadata of the first content item.

Embodiments can include one or more of the following features.

In some embodiments, the metric can represent a degree of importance of the first multimedia content item to the user.

In some embodiments, the one or more first sensors can include at least one of: a camera of the wearable multimedia device, a microphone of the wearable multimedia device, or a depth sensor of the wearable multimedia device.

In some embodiments, the first content item can include at least one of video or audio.

In some embodiments, the biometric data can include a plurality of types of data. Further, determining the metric for the first content item can include: determining, for each of the types of data, a corresponding score; and determining the metric based on a weighted sum of the scores.

In some embodiments, the types of data can include at least one of: a body temperature of the user, a heart rate of the user, a respiration rate of the user, or a perspiration rate of the user.

In some embodiments, the metric can increase with an increase in the body temperature of the user.

In some embodiments, the metric can increase with an increase in the heart rate of the user.

In some embodiments, the metric can increase with an increase in the respiration rate of the user.

In some embodiments, the metric can increase with an increase in the perspiration rate of the user.

In some embodiments, at least a portion of the sensor data can be obtained concurrently with the biometric data.

In some embodiments, at least a portion of the sensor data can be obtained prior to the biometric data.

In some embodiments, at least a portion of the sensor data can be obtained subsequent to the biometric data.

In some embodiments, the method can further include: obtaining first location data representing a current location of the user of the wearable multimedia device; obtaining second location data representing a travel history of the user of the wearable multimedia device; and determining, based on the first location data and the second location data, a frequency metric representing a frequency at which the user has traveled to the current location. The metric for the first content item can be determined further based on the frequency metric.

In some embodiments, the metric can increase with a decrease in the frequency metric.

In some embodiments, the method can further include: obtaining a plurality of content items including the first content item, where each of the content items comprises a respective metric stored as metadata; filtering the plurality of content items based on the metrics; and presenting at least some of the plurality of content items to the user based on the filtering.

In some embodiments, the method can further include receiving, from the user, a request for presentation of one or more of the plurality of content items. The request can include one or more search criteria. The plurality of content items can be filtered further based on the one or more search criteria.

In some embodiments, filtering the plurality of content items cam include: determining a first subset of the content items having metrics that exceed a threshold value, and determining a second subset of the content items having metrics that do not exceed the threshold value.

In some embodiments, presenting at least some of the plurality of content items to the user can include: presenting the first subset of the content items to the user, and refraining from presenting the second subset of the content items to the user.

In some embodiments, filtering the plurality of content items can include ranking the plurality of content items based on the metrics.

In some embodiments, presenting at least some of the plurality of content items to the user can include presenting at least some of the plurality of content items in a sequence. The sequence can be determined based on the ranking of the plurality of content items.

In at least some embodiments, a wearable multimedia device includes: at least one processor; and memory storing instructions that, when executed by the at least one processor, cause the at least one processor to perform various operations, including one or more of the methods described herein.

In at least some embodiments, one or more non-transitory computer-readable media store instructions that, when executed by at least one processor, cause the at least one processor to perform operations, including one or more of the methods described herein.

The details of the disclosed embodiments are set forth in the accompanying drawings and the description below. Other features, objects and advantages are apparent from the description, drawings and claims.

DESCRIPTION OF DRAWINGS

FIG. 5 illustrates data objects used by the data processing system of FIG. 2, according to an embodiment.

FIGS. 14A-14C are diagrams of example operations performed by a wearable multimedia device.

The same reference symbol used in various drawings indicates like elements.

DETAILED DESCRIPTION

Example Wearable Multimedia Device

Figure 1:
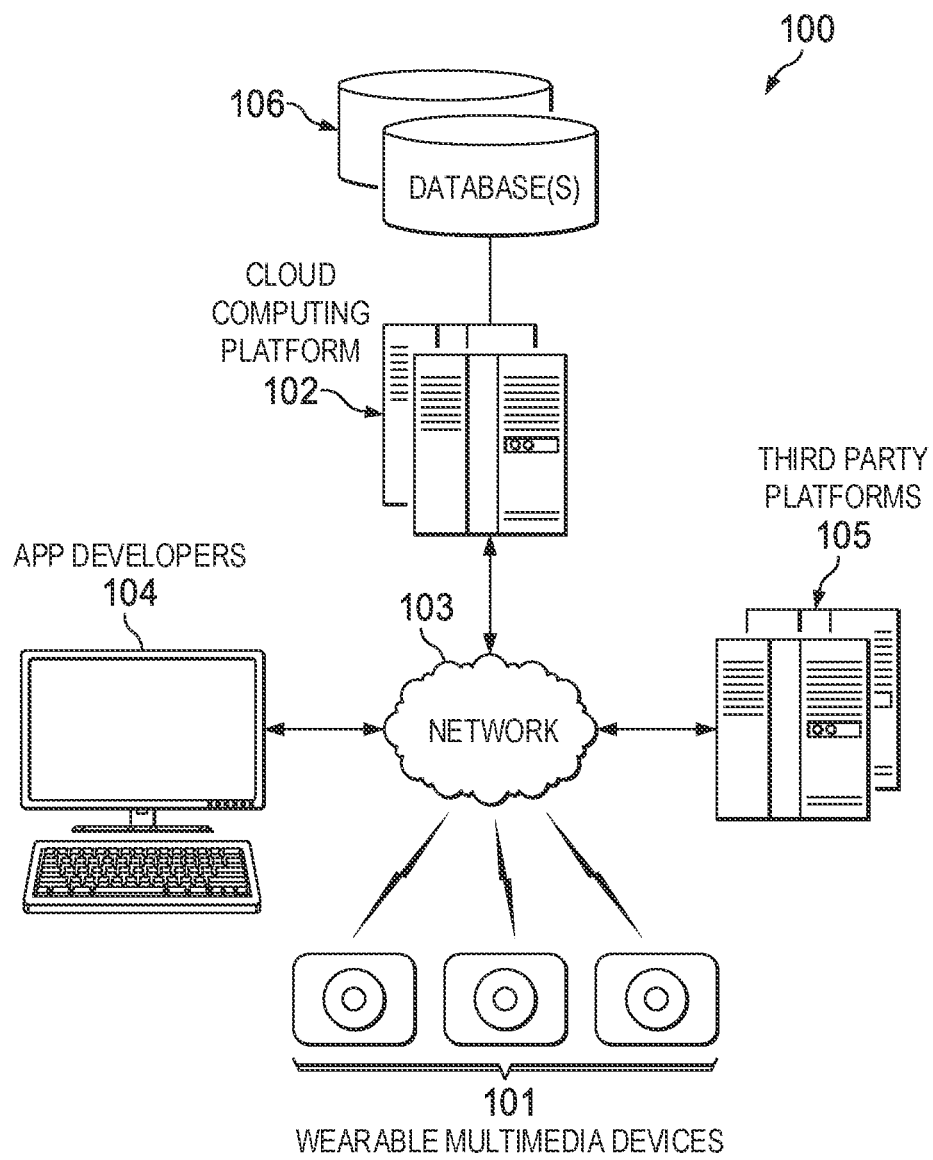
FIG. 1 is a block diagram of an operating environment for a wearable multimedia device and cloud computing platform with an application ecosystem for processing multimedia data captured by the wearable multimedia device, according to an embodiment

The features and processes described herein can be implemented on a wearable multimedia device. In an embodiment, the wearable multimedia device is a lightweight, small form factor, battery-powered device that can be attached to a user's clothing or an object using a tension clasp, interlocking pin back, magnet, or any other attachment mechanism. The wearable multimedia device includes a digital image capture device (e.g., a camera with a 180° FOV with optical image stabilizer (OIS)) that allows a user to spontaneously and/or continuously capture multimedia data (e.g., video, audio, depth data, biometric data) of life events ("moments") and document transactions (e.g., financial transactions) with minimal user interaction or device set-up. The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In an embodiment, the context data is processed by server computer(s) of the cloud computing platform based on user preferences. For example, images can be color graded, stabilized and cropped perfectly to the moment the user wants to relive based on the user preferences. The user preferences can be stored in a user profile created by the user through an online account accessible through a website or portal, or the user preferences can be learned by the platform over time (e.g., using machine learning). In an embodiment, the cloud computing platform is a scalable distributed computing environment. For example, the cloud computing platform can be a distributed streaming platform (e.g., Apache Kafka™) with real-time streaming data pipelines and streaming applications that transform or react to streams of data.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes).

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including WiFi, 3G, 4G and 5G communication technologies. In an embodiment, the headset or earbuds also include sensors (e.g., biometric sensors, inertial sensors) that provide information about the direction the user is facing, to provide commands with head gestures or playback of spatial audio, etc. In an embodiment, the camera direction can be controlled by the head gestures, such that the camera view follows the user's view direction. In an embodiment, the wearable multimedia device can be embedded in or attached to the user's glasses.

In an embodiment, the wearable multimedia device includes a projector (e.g., a laser projector, LCoS, DLP, LCD), or can be wired or wirelessly coupled to an external projector, that allows the user to replay a moment on a surface such as a wall or table top or on a surface of the user's hand (e.g., the user's palm). In another embodiment, the wearable multimedia device includes an output port that can connect to a projector or other output device.

In an embodiment, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured, optionally cropped (e.g., to protect privacy), and sent to the cloud computing platform where an image recognition application can run an image query and store or return the results to the user. Air and touch gestures can also be performed on a projected ephemeral display, for example, responding to user interface elements projected on a surface.

In an embodiment, the context data can be encrypted on the device and on the cloud computing platform so that only the user or any authorized viewer can relive the moment on a connected screen (e.g., smartphone, computer, television, etc.) or as a projection on a surface. An example architecture for the wearable multimedia device is described in reference to FIG. 8.

In addition to personal life events, the wearable multimedia device simplifies the capture of financial transactions that are currently handled by smartphones. The capture of every day transactions (e.g., business transactions, micro transactions) is made simpler, faster and more fluid by using sight assisted contextual awareness provided by the wearable multimedia device. For example, when the user engages in a financial transaction (e.g., making a purchase), the wearable multimedia device will generate data memorializing the financial transaction, including a date, time, amount, digital images or video of the parties, audio (e.g., user commentary describing the transaction) and environment data (e.g., location data). The data can be included in a multimedia data stream sent to the cloud computing platform, where it can be stored online and/or processed by one or more financial applications (e.g., financial management, accounting, budget, tax preparation, inventory, etc.).

In an embodiment, the cloud computing platform provides graphical user interfaces on a website or portal that allows various third party application developers to upload, update and manage their applications in an application ecosystem. Some example applications can include but are not limited to: personal live broadcasting (e.g., Instagram™ Life, Snapchat™), senior monitoring (e.g., to ensure that a loved one has taken their medicine), memory recall (e.g., showing a child's soccer game from last week) and personal guide (e.g., AI enabled personal guide that knows the location of the user and guides the user to perform an action).

In an embodiment, the wearable multimedia device includes one or more microphones and a headset. In some embodiments, the headset wire includes the microphone. In an embodiment, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

In an embodiment, the device can include photovoltaic surface technology to sustain battery life and inductive charging circuitry (e.g., Qi) to allow for inductive charging on charge mats and wireless over-the-air (OTA) charging.

In an embodiment, the wearable multimedia device is configured to magnetically couple or mate with a rechargeable portable battery pack. The portable battery pack includes a mating surface that has permanent magnet (e.g., N pole) disposed thereon, and the wearable multimedia device has a corresponding mating surface that has permanent magnet (e.g., S pole) disposed thereon. Any number of permanent magnets having any desired shape or size can be arranged in any desired pattern on the mating surfaces.

The permanent magnets hold portable battery pack and wearable multimedia device together in a mated configuration with clothing (e.g., a user's shirt) therebetween. In an embodiment, the portable battery pack and wearable multimedia device have the same mating surface dimensions, such that there is no overhanging portions when in a mated configuration. A user magnetically fastens the wearable multimedia device to their clothing by placing the portable battery pack underneath their clothing and placing the wearable multimedia device on top of portable battery pack outside their clothing, such that permanent magnets attract each other through the clothing.

In an embodiment, the portable battery pack has a built-in wireless power transmitter which is used to wirelessly power the wearable multimedia device while in the mated configuration using the principle of resonant inductive coupling. In an embodiment, the wearable multimedia device includes a built-in wireless power receiver which is used to receive power from the portable battery pack while in the mated configuration.

System Overview

FIG. 1 is a block diagram of an operating environment for a wearable multimedia device and cloud computing platform with an application ecosystem for processing multimedia data captured by the wearable multimedia device, according to an embodiment. Operating environment 100 includes wearable multimedia devices 101, cloud computing platform 102, network 103, application ("app") developers 104 and third party platforms 105. Cloud computing platform 102 is coupled to one or more databases 106 for storing context data uploaded by wearable multimedia devices 101.

As previously described, wearable multimedia devices 101 are lightweight, small form factor, battery-powered devices that can be attached to a user's clothing or an object using a tension clasp, interlocking pin back, magnet or any other attachment mechanism. Wearable multimedia devices 101 include a digital image capture device (e.g., a camera with a 180° FOV and OIS) that allows a user to spontaneously capture multimedia data (e.g., video, audio, depth data) of "moments" and document every day transactions (e.g., financial transactions) with minimal user interaction or device set-up. The context data captured by wireless multimedia devices 101 are uploaded to cloud computing platform 102. Cloud computing platform 102 includes an application ecosystem that allows the context data to be processed, edited and formatted by one or more server side applications into any desired presentation format (e.g., single image, image stream, video clip, audio clip, multimedia presentation, images gallery) that can be downloaded and replayed on the wearable multimedia device and/or other playback device.

By way of example, at a child's birthday party a parent can clip the wearable multimedia device on their clothing (or attached the device to a necklace or chain and wear around their neck) so that the camera lens is facing in their view direction. The camera includes a 180° FOV that allows the camera to capture almost everything that the user is currently seeing. The user can start recording by simply tapping the surface of the device or pressing a button or speaking a command. No additional set-up is required. A multimedia data stream (e.g., video with audio) is recorded that captures the special moments of the birthday (e.g., blowing out the candles). This "context data" is sent to cloud computing platform 102 in real-time through a wireless network (e.g., WiFi, cellular). In an embodiment, the context data is stored on the wearable multimedia device so that it can be uploaded at a later time. In another embodiment, the user can transfer the context data to another device (e.g., personal computer hard drive, smartphone, tablet computer, thumb drive) and upload the context data to cloud computing platform 102 at a later time using an application.

In an embodiment, the context data is processed by one or more applications of an application ecosystem hosted and managed by cloud computing platform 102. Applications can be accessed through their individual application programming interfaces (APIs). A custom distributed streaming pipeline is created by cloud computing platform 102 to process the context data based on one or more of the data type, data quantity, data quality, user preferences, templates and/or any other information to generate a desired presentation based on user preferences. In an embodiment, machine learning technology can be used to automatically select suitable applications to include in the data processing pipeline with or without user preferences. For example, historical user context data stored in a database (e.g., NoSQL database) can be used to determine user preferences for data processing using any suitable machine learning technology (e.g., deep learning or convolutional neural networks).

In an embodiment, the application ecosystem can include third party platforms 105 that process context data. Secure sessions are set-up between cloud computing platform 102 and third party platforms 105 to send/receive context data. This design allows third party app providers to control access to their application and to provide updates. In other embodiments, the applications are run on servers of cloud computing platform 102 and updates are sent to cloud computing platform 102. In the latter embodiment, app developers 104 can use an API provided by cloud computing platform 102 to upload and update applications to be included in the application ecosystem.

Example Data Processing System

Figure 2:
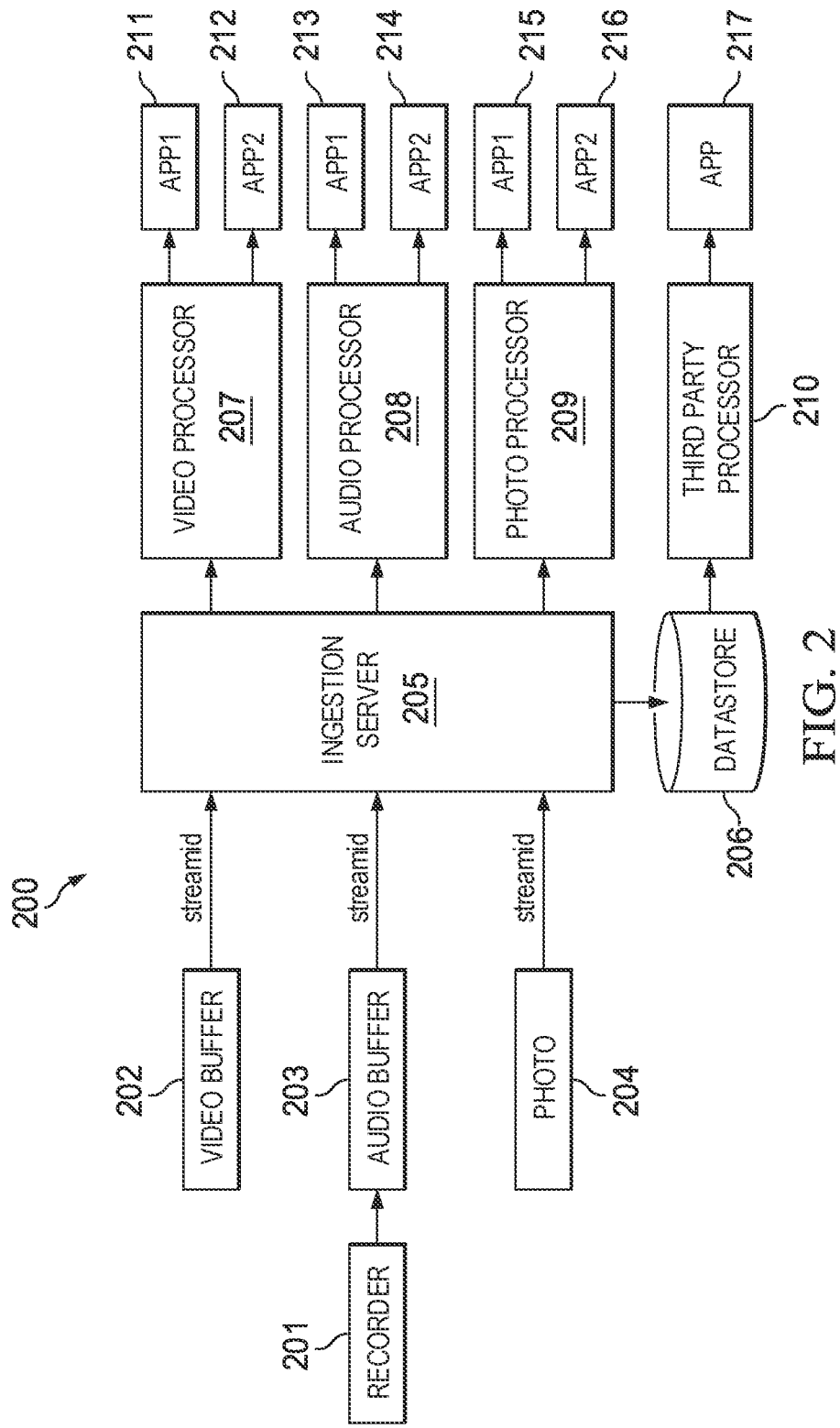
FIG. 2 is a block diagram of a data processing system implemented by the cloud computing platform of FIG. 1, according to an embodiment.

FIG. 2 is a block diagram of a data processing system implemented by the cloud computing platform of FIG. 1, according to an embodiment. Data processing system 200 includes recorder 201, video buffer 202, audio buffer 203, photo buffer 204, ingestion server 205, data store 206, video processor 207, audio processor 208, photo processor 209 and third party processor 210.

A recorder 201 (e.g., a software application) running on a wearable multimedia device records video, audio and photo data ("context data") captured by a camera and audio subsystem, and stores the data in buffers 202, 203, 204, respectively. This context data is then sent (e.g., using wireless OTA technology) to ingestion server 205 of cloud computing platform 102. In an embodiment, the data can be sent in separate data streams each with a unique stream identifier (streamid). The streams are discrete pieces of data that may contain the following example attributes: location (e.g., latitude, longitude), user, audio data, video stream of varying duration and N number of photos. A stream can have a duration of 1 to MAXSTREAM_LEN seconds, where in this example MAXSTREAM_LEN=20 seconds.

Ingestion server 205 ingests the streams and creates a stream record in data store 206 to store the results of processors 207-209. In an embodiment, the audio stream is processed first and is used to determine the other streams that are needed. Ingestion server 205 sends the streams to the appropriate processor 207-209 based on streamid. For example, the video stream is sent to video processor 207, the audio stream is sent to audio processor 208 and the photo stream is sent to photo processor 209. In an embodiment, at least a portion of data collected from the wearable multimedia device (e.g., image data) is processed into metadata and encrypted so that it can be further processed by a given application and sent back to the wearable multimedia device or other device.

Processors 207-209 can run proprietary or third party applications as previously described. For example, video processor 207 can be a video processing server that sends raw video data stored in video buffer 202 to a set of one or more image processing/editing applications 211, 212 based on user preferences or other information. Processor 207 sends requests to applications 211, 212, and returns the results to ingestion server 205. In an embodiment, third party processor 210 can process one or more of the streams using its own processor and application. In another example, audio processor 208 can be an audio processing server that sends speech data stored in audio buffer 203 to a speech-to-text converter application 213.

Example Scene Identification Application

Figure 3:
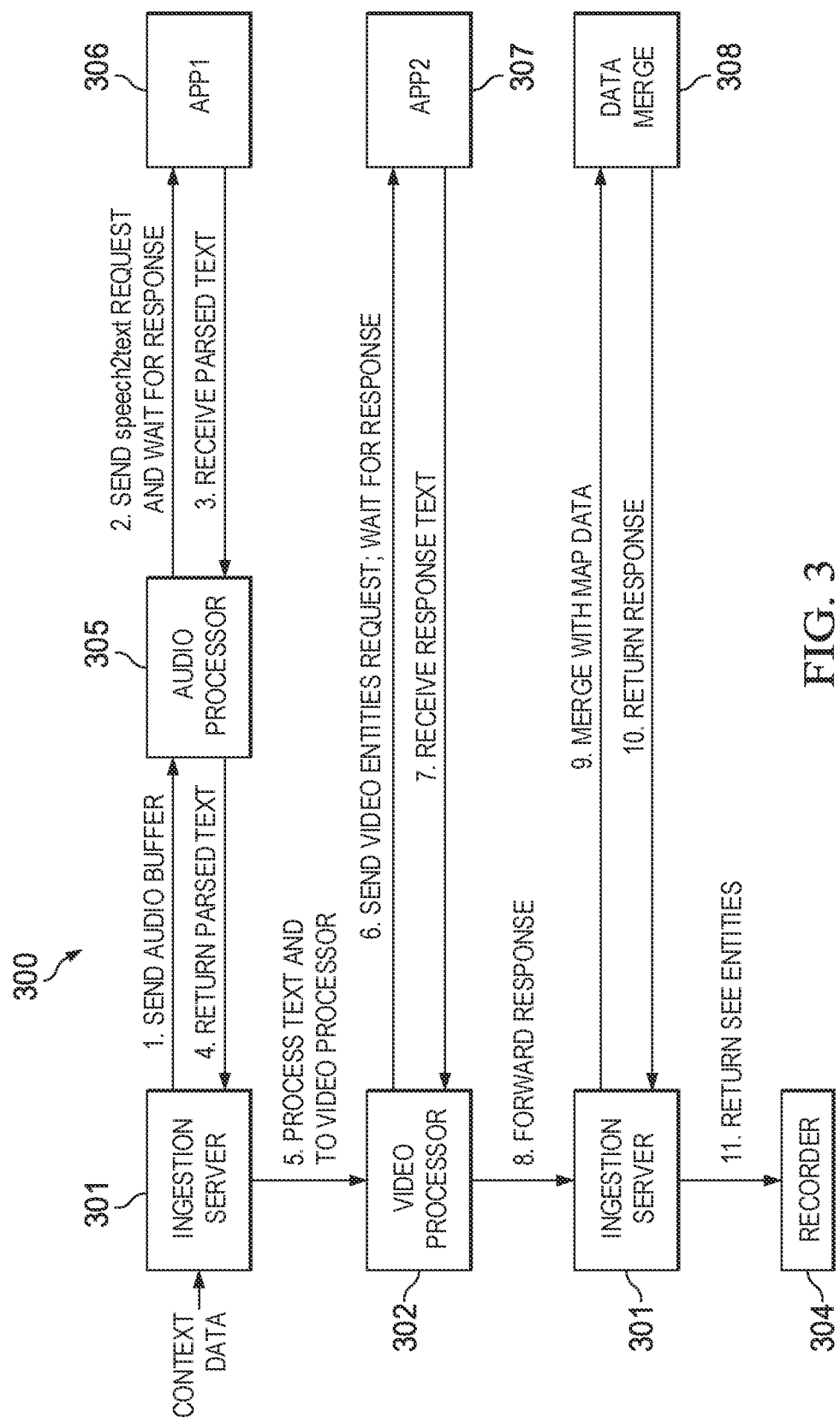
FIG. 3 is a block diagram of a data processing pipeline for processing a context data stream, according to an embodiment.

FIG. 3 is a block diagram of a data processing pipeline for processing a context data stream, according to an embodiment. In this embodiment, data processing pipeline 300 is created and configured to determine what the user is seeing based on the context data captured by a wearable multimedia device worn by the user. Ingestion server 301 receives an audio stream (e.g., including user commentary) from audio buffer 203 of wearable multimedia device and sends the audio stream to audio processor 305. Audio processor 305 sends the audio stream to app 306 which performs speech-to-text conversion and returns parsed text to audio processor 305. Audio processor 305 returns the parsed text to ingestion server 301.

Video processor 302 receives the parsed text from ingestion server 301 and sends a request to video processing app 307. Video processing app 307 identifies objects in the video scene and uses the parsed text to label the objects. Video processing app 307 sends a response describing the scene (e.g., labeled objects) to video processor 302. Video processor then forwards the response to ingestion server 301. Ingestion server 301 sends the response to data merge process 308, which merges the response with the user's location, orientation and map data. Data merge process 308 returns a response with a scene description to recorder 304 on the wearable multimedia device. For example, the response can include text describing the scene as the child's birthday party, including a map location and a description of objects in the scene (e.g., identify people in the scene). Recorder 304 associates the scene description with the multimedia data (e.g., using a streamid) stored on the wearable multimedia device. When the user recalls the data, the data is enriched with the scene description.

In an embodiment, data merge process 308 may use more than just location and map data. There can also be a notion of ontology. For example, the facial features of the user's Dad captured in an image can be recognized by the cloud computing platform, and be returned as "Dad" rather than the user's name, and an address such as "555 Main Street, San Francisco, CA" can be returned as "Home." The ontology can be specific to the user and can grow and learn from the user's input.

Example Transportation Application

Figure 4:
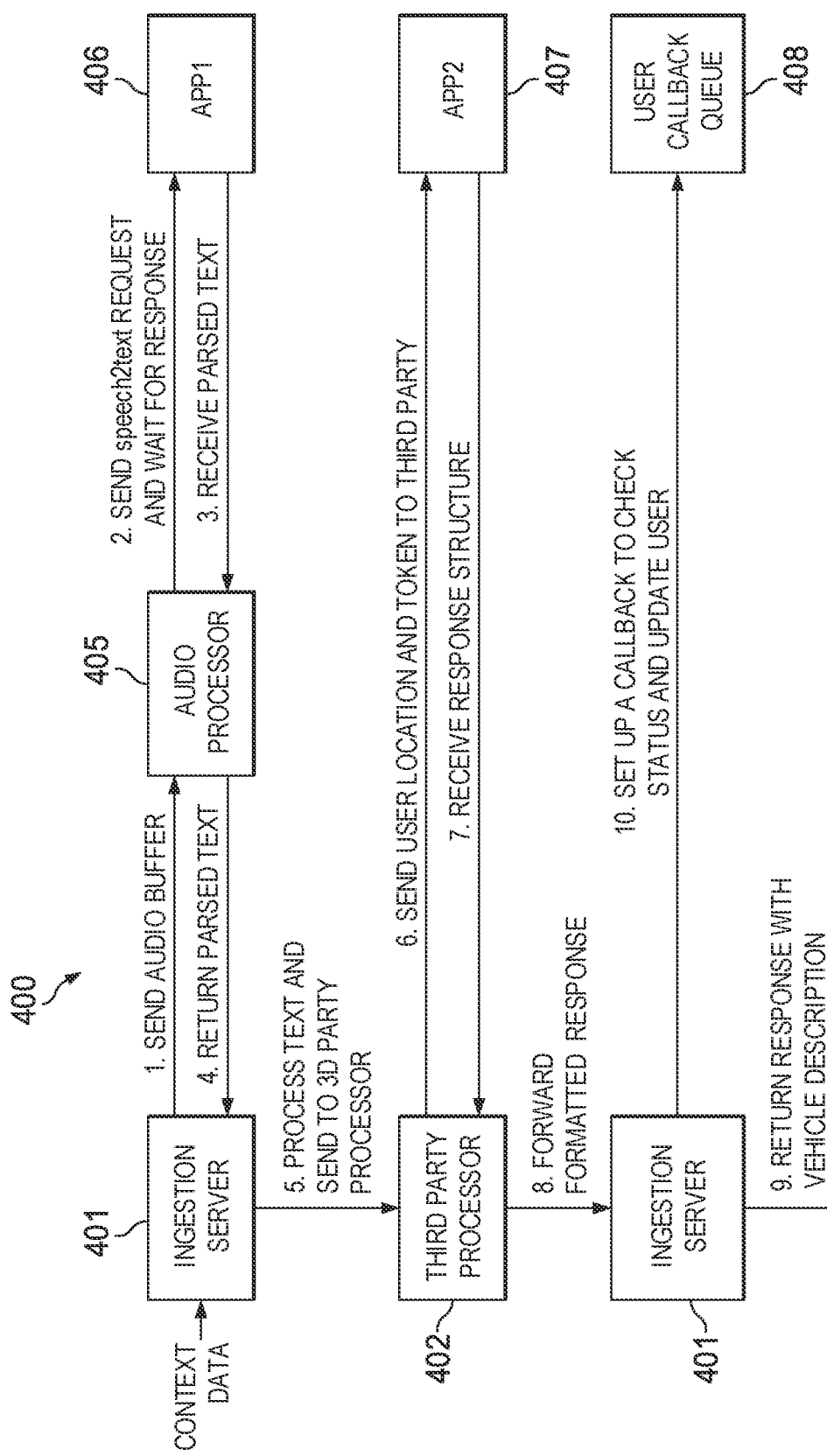
FIG. 4 is a block diagram of another data processing for processing a context data stream for a transportation application, according to an embodiment.

FIG. 4 is a block diagram of another data processing for processing a context data stream for a transportation application, according to an embodiment. In this embodiment, data processing pipeline 400 is created to call a transportation company (e.g., Uber®, Lyft®) to get a ride home. Context data from a wearable multimedia device is received by ingestion server 401 and an audio stream from an audio buffer 203 is sent to audio processor 405. Audio processor 405 sends the audio stream to app 406, which converts the speech to text. The parsed text is returned to audio processor 405, which returns the parsed text to ingestion server 401 (e.g., a user speech request for transportation). The processed text is sent to third party processor 402. Third party processor 402 sends the user location and a token to a third party application 407 (e.g., Uber® or Lyft™® application). In an embodiment, the token is an API and authorization token used to broker a request on behalf of the user. Application 407 returns a response data structure to third party processor 402, which is forwarded to ingestion server 401. Ingestion server 401 checks the ride arrival status (e.g., ETA) in the response data structure and sets up a callback to the user in user callback queue 408. Ingestion server 401 returns a response with a vehicle description to recorder 404, which can be spoken to the user by a digital assistant through a loudspeaker on the wearable multimedia device, or through the user's headphones or earbuds via a wired or wireless connection.

FIG. 5 illustrates data objects used by the data processing system of FIG. 2, according to an embodiment. The data objects are part of software component infrastructure instantiated on the cloud computing platform. A "streams" object includes the data streamid, deviceid, start, end, lat, lon, attributes and entities. "Streamid" identifies the stream (e.g., video, audio, photo), "deviceid" identifies the wearable multimedia device (e.g., a mobile device ID), "start" is the start time of the context data stream, "end" is the end time of the context data stream, "lat" is the latitude of the wearable multimedia device, "lon" is the longitude of the wearable multimedia device, "attributes" include, for example, birthday, facial points, skin tone, audio characteristics, address, phone number, etc., and "entities" make up an ontology. For example, the name "John Do" would be mapped to "Dad" or "Brother" depending on the user.

A "Users" object includes the data userid, deviceid, email, fname and lname. Userid identifies the user with a unique identifier, deviceid identifies the wearable device with a unique identifier, email is the user's registered email address, fname is the user's first name and lname is the user's last name. A "Userdevices" object includes the data userid and deviceid. A "devices" object includes the data deviceid, started, state, modified and created. In an embodiment, deviceid is a unique identifier for the device (e.g., distinct from a MAC address). Started is when the device was first started. State is on/off/sleep. Modified is the last modified date, which reflects the last state change or operating system (OS) change. Created is the first time the device was turned on.

A "ProcessingResults" object includes the data streamid, ai, result, callback, duration an accuracy. In an embodiment, streamid is each user stream as a Universally Unique Identifier (UUID). For example, a stream that was started from 8:00 AM to 10:00 AM will have id: 15h158dhb4 and a stream that starts from 10:15 AM to 10:18 AM will have a UUID that was contacted for this stream. AI is the identifier for the platform application that was contacted for this stream. Result is the data sent from the platform application. Callback is the callback that was used (versions can change hence the callback is tracked in case the platform needs to replay the request). Accuracy is the score for how accurate the result set is. In an embodiment, processing results can be used for multiple tasks, such as 1) to inform the merge server of the full set of results, 2) determine the fastest AI so that user experience can be enhanced, and 3) determine the most accurate ai. Depending on the use case, one may favor speed over accuracy or vice versa.

An "Entities" object includes the data entityID, userID, entityName, entityType and entityAttribute. EntityID is a UUID for the entity and an entity having multiple entries where the entityID references the one entity. For example, "Barack Obama" would have an entityID of 144, which could be linked in an associations table to POTUS44 or "Barack Hussein Obama" or "President Obama." UserID identifies the user that the entity record was made for. EntityName is the name that the userID would call the entity. For example, Malia Obama's entityName for entityID 144 could be "Dad" or "Daddy." EntityType is a person, place or thing. EntityAttribute is an array of attributes about the entity that are specific to the userID's understanding of that entity. This maps entities together so that when, for example, Malia makes the speech query: "Can you see Dad?", the cloud computing platform can translate the query to Barack Hussein Obama and use that in brokering requests to third parties or looking up information in the system.

Example Processes

Figure 6:
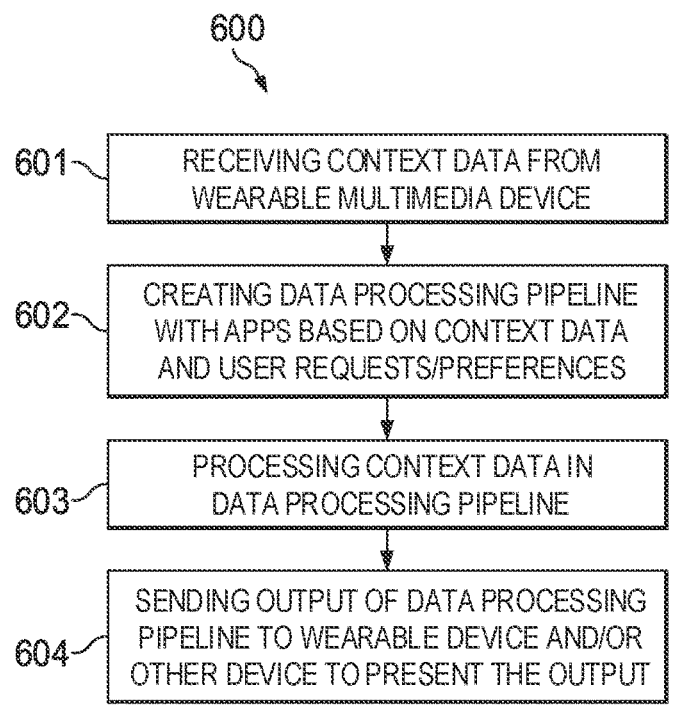
FIG. 6 is a flow diagram of a data pipeline process, according to an embodiment.

FIG. 6 is flow diagram of a data pipeline process, according to an embodiment. Process 600 can be implemented using wearable multimedia devices 101 and cloud computing platform 102 described in reference to FIGS. 1-5.

Process 600 can begin by receiving context data from a wearable multimedia device (601). For example, the context data can include video, audio and still images captured by a camera and audio subsystem of the wearable multimedia device.

Process 600 can continue by creating (e.g., instantiating) a data processing pipeline with applications based on the context data and user requests/preferences (602). For example, based on user requests or preferences, and also based on the data type (e.g., audio, video, photo), one or more applications can be logically connected to form a data processing pipeline to process the context data into a presentation to be playback on the wearable multimedia device or another device.

Process 600 can continue by processing the context data in the data processing pipeline (603). For example, speech from user commentary during a moment or transaction can be converted into text, which is then used to label objects in a video clip.

Process 600 can continue by sending the output of the data processing pipeline to the wearable multimedia device and/or other playback device (604).

Example Cloud Computing Platform Architecture

Figure 7:
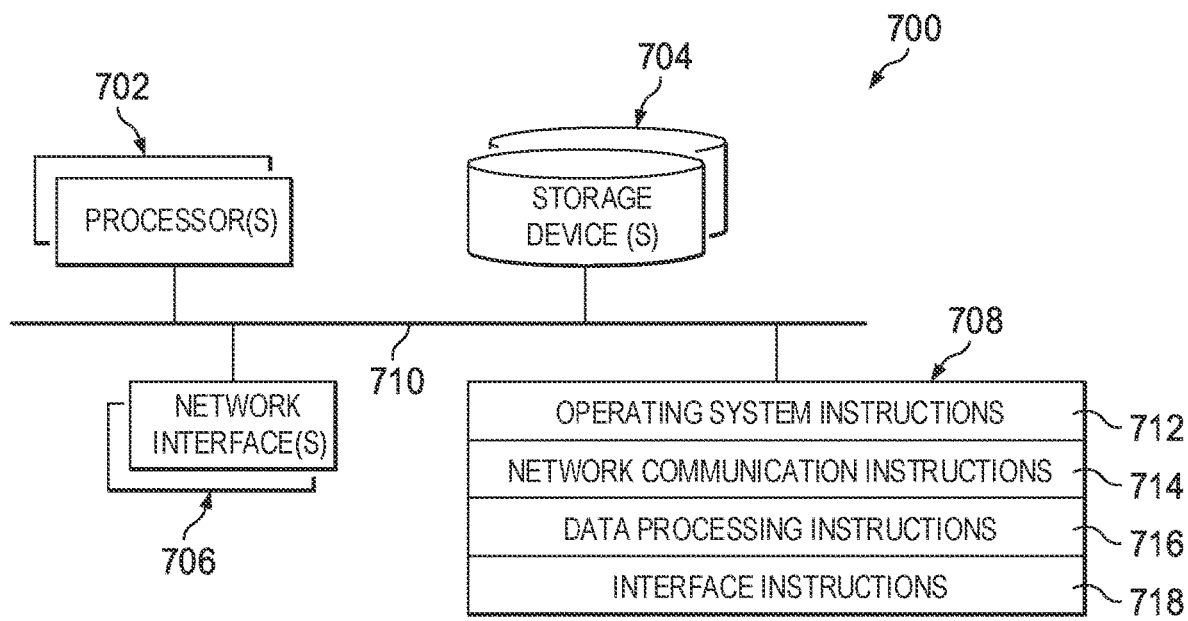
FIG. 7 is an architecture for the cloud computing platform, according to an embodiment.

FIG. 7 is an example architecture 700 for cloud computing platform 102 described in reference to FIGS. 1-6, according to an embodiment. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium(s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows® NT server, Linux Server), network communication module 714, interface instructions 716 and data processing instructions 718.

Operating system 712 can be multi-user, multiprocessing, multitasking, multithreading, real time, etc. Operating system 712 performs basic tasks, including but not limited to: recognizing input from and providing output to devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.) and for creating a distributed streaming platform using, for example, Apache Kafka™. Data processing instructions 716 include server-side or backend software for implementing the server-side operations, as described in reference to FIGS. 1-6. Interface instructions 718 includes software for implementing a web server and/or portal for sending and receiving data to and from wearable multimedia devices 101, third party application developers 104 and third party platforms 105, as described in reference to FIG. 1.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Wearable Multimedia Device Architecture

Figure 8:
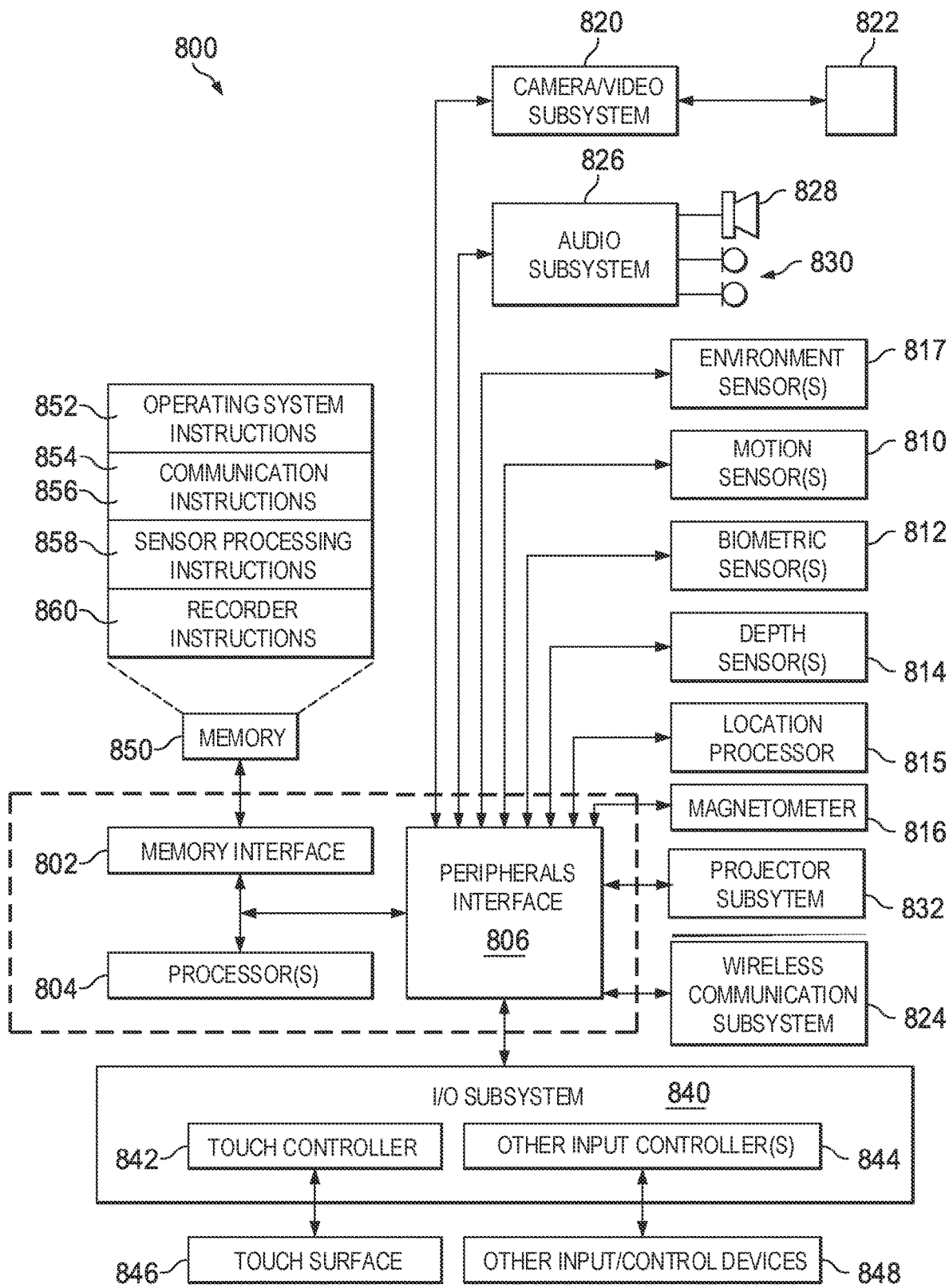
FIG. 8 is an architecture for the wearable multimedia device, according to an embodiment.

FIG. 8 is a block diagram of example architecture 800 for a wearable multimedia device implementing the features and processes described in reference to FIGS. 1-6. Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functions. For example, motion sensor(s) 810, biometric sensor(s) 812, and depth sensor(s) 814 may be coupled to peripherals interface 806 to facilitate motion, orientation, biometric, and depth detection functions. In some implementations, motion sensor(s) 810 (e.g., an accelerometer, rate gyroscope) may be utilized to detect movement and orientation of the wearable multimedia device.

Other sensors may also be connected to peripherals interface 806, such as environmental sensor(s) (e.g., temperature sensor, barometer, ambient light) to facilitate environment sensing functions. For example, a biometric sensor can detect fingerprints, face recognition, heart rate and other fitness parameters. In an embodiment, a haptic motor (not shown) can be coupled to the peripheral interface, which can provide vibration patterns as haptic feedback to the user.

Location processor 815 (e.g., GNSS receiver chip) may be connected to peripherals interface 806 to provide geo-referencing. Electronic magnetometer 816 (e.g., an integrated circuit chip) may also be connected to peripherals interface 806 to provide data that may be used to determine the direction of magnetic North. Thus, electronic magnetometer 816 may be used by an electronic compass application.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and OIS. The depth sensor can include an infrared emitter that projects dots in a known pattern onto an object/subject. The dots are then photographed by a dedicated infrared camera and analyzed to determine depth data. In an embodiment, a time-of-flight (TOF) camera can be used to resolve distance based on the known speed of light and measuring the time-of-flight of a light signal between the camera and an object/subject for each point of the image.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication sub system 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., WiFi, WiMax, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and beamforming.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

Further, a projector subsystem 832 may be connected to peripherals interface 806 to present information visually to a user in the form of projected light. For example, the projector subsystem 832 can project light onto a surface according to a particular spatial and/or temporal pattern, such that the user perceives text, images, videos, colors, patterns, and/or any other graphical information on the surface. In some implementations, the projector subsystem 832 can project light onto a surface of the user's body, such as the user's hand or palm. In some implementations, the projector subsystem 832 can project light onto a surface other than the user's body, such as a wall, a table, a desk, or any other object. The projector subsystem 832 is described in greater detail with reference to FIG. 9.

In some implementations, the projector subsystem 832 project light onto a surface to provide an interactive VI for a user. For example, the projector subsystem 832 can project light onto the surface, such that the user perceives one or more interactive user interface elements (e.g., selectable buttons, dials, switches, boxes, images, videos, text, icons, etc.). Further, the user can interact with the VI by performing one or more gestures with respect to the VI and the user interface elements. For example, the user can perform a pointing gesture, a tapping gesture, a swiping gesture, a waving gesture, or any other gesture using her hands and/or fingers. In some implementations, a user can perform a gesture using a single hand at a time (e.g., using the hand upon which the VI is projected or her other hand). In some implementations, a user can perform a gesture using two hands concurrently. The wearable multimedia device can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804). Example VIs are described in further detail below.

In some implementations, the wearable multimedia device 101 can detect the type of surface that is positioned in the projection area of the projector subsystem 832 (e.g., using the camera/video subsystems 820, environment sensor(s) 817, depth sensor(s) 814, etc.), and adjust one or more characteristics of the VI based on the type of surface that is detected. This can be beneficial, for example, in improving the legibility and usability of the VI in different operating environments and/or use cases.

As an example, the wearable multimedia device 101 can detect that a surface of the user's hand (e.g., the user's palm)

is positioned in the projection area of the projector subsystem. As the surface area of the user's hand may be constrained (e.g., compared to a surface of a desk or wall), the wearable multimedia device 101 can reduce the overall size of the VI, such that the VI can be presented in its entirety on the user hand. Further, the wearable multimedia device 101 can adjust the size, colors, shapes, spacing, complexity, and/or other visual characteristics of the use interface elements of the VI, such that the user can readily interpret and/or interact with each of the user interface elements.

As an example, the wearable multimedia device 101 can detect that a surface of a wall, table, desk, etc. is positioned in the projection area of the projector subsystem. As the surface area of a wall, table, desk, etc. may be larger (e.g., compared to a surface of the user's hand), the wearable multimedia device 101 can increase the overall size of the VI to make better use of the larger projection surface. Further, the wearable multimedia device 101 can adjust the size, colors, shapes, spacing, complexity, and/or other visual characteristics of the use interface elements of the VI, such that the user can readily interpret and/or interact with each of the user interface elements.

In some implementations, device 800 plays back to a user recorded audio and/or video files (including spatial audio), such as MP3, AAC, spatial audio and MPEG video files. In some implementations, device 800 may include the functionality of an MP3 player and may include a pin connector or other port for tethering to other devices. Other input/output and control devices may be used. In an embodiment, device 800 may include an audio processing unit for streaming audio to an accessory device over a direct or indirect communication link.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, iOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location of the device.

Memory 850 may include sensor processing instructions 858 to facilitate sensor-related processing and functions and recorder instructions 860 to facilitate recording functions, as described in reference to FIGS. 1-6. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

Figure 9:
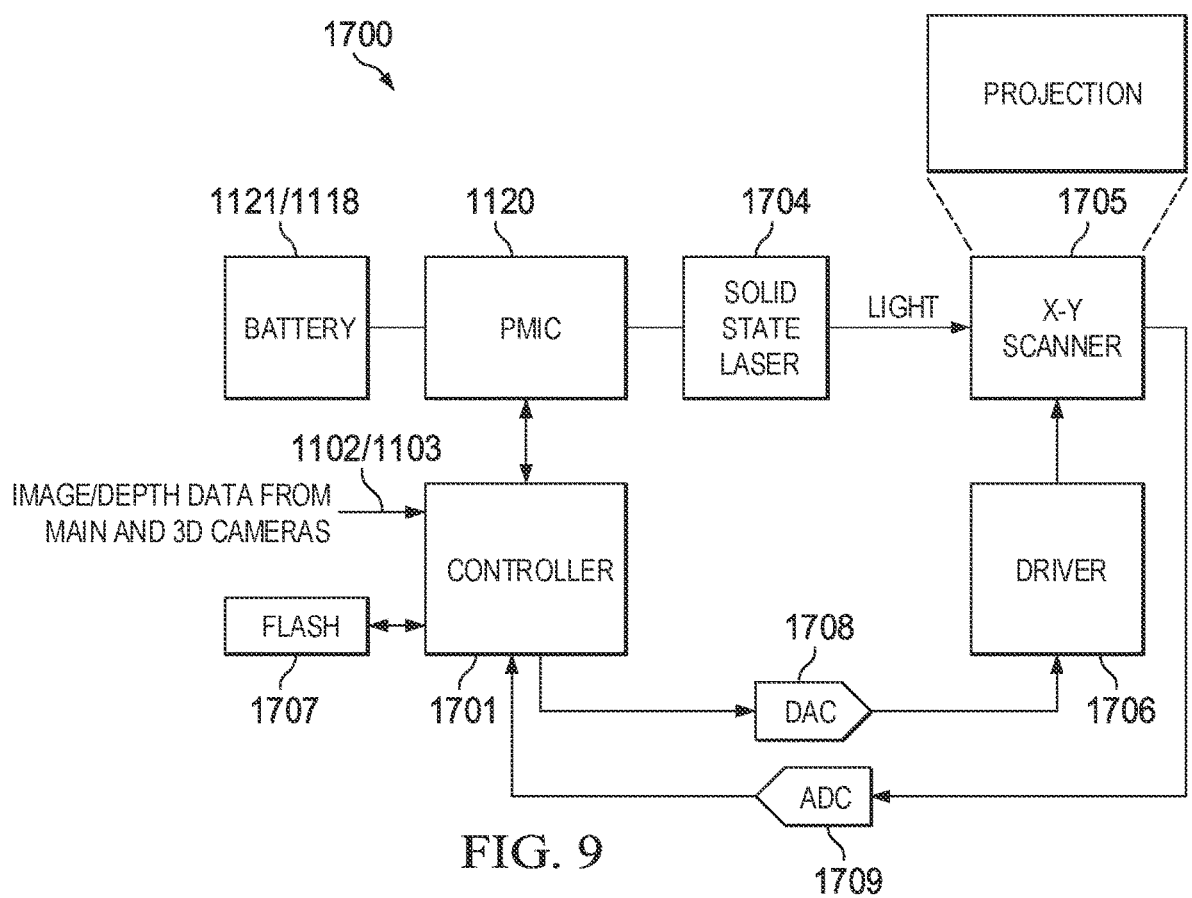
FIG. 9 is a system block diagram of a projector architecture, according to an embodiment.

FIG. 9 is a system block diagram of the projector subsystem 832, according to an embodiment. The projector subsystem 832 scans a pixel in two dimensions, images a 2D array of pixels, or mixes imaging and scanning. Scanning projectors directly utilize the narrow divergence of laser beams, and two-dimensional (2D) scanning to "paint" an image pixel by pixel. In some embodiments, separate scanners are used for the horizontal and vertical scanning directions. In other embodiments, a single biaxial scanner is used. The specific beam trajectory also varies depending on the type of scanner used.

In the example shown, the projector subsystem 832 is a scanning pico-projector that includes controller 901, battery 902, power management chip (PMIC) 903, solid state laser 904, X-Y scanner 905, driver 906, memory 907, digital-to-analog converter (DAC) 908 and analog-to-digital converter (ADC) 909.

Controller 901 provides control signals to X-Y scanner 905. X-Y scanner 905 uses moveable mirrors to steer the laser beam generated by solid state laser 904 in two dimensions in response to the control signals. X-Y scanner 95 includes one or more micro-electromechanical (MEMS) micromirrors that have controllable tilt angles in one or two dimensions. Driver 906 includes a power amplifier and other electronic circuitry (e.g., filters, switches) to provide the control signals (e.g., voltages or currents) to X-Y scanner 905. Memory 907 stores various data used by the projector including laser patterns for text and images to be projected. DAC 908 and ADC 909 provide data conversion between digital and analog domains. PMIC 903 manages the power and duty cycle of solid state laser 1904, including turning on and shutting of solid state laser 904 and adjusting the amount of power supplied to solid state laser 904. Solid state laser 904 can be, for example, a vertical-cavity surface-emitting laser (VCSEL).

In an embodiment, controller 901 uses image data from the camera/video subsystem 820 and/or depth data from the depth sensor(s) 814 to recognize and track user hand and/or finger positions on the laser projection, such that user input is received by the wearable multimedia device 101 using the laser projection as an input interface.

In another embodiment, the projector subsystem 832 uses a vector-graphic projection display and low-powered fixed MEMS micromirrors to conserve power. Because the projector subsystem 832 includes a depth sensor, the projected area can be masked when necessary to prevent projecting on a finger/hand interacting with the laser projected image. In an embodiment, the depth sensor can also track gestures to control the input on another devices (e.g., swiping through images on a TV screen, interacting with computers, smart speakers, etc.).

In other embodiments, Liquid Crystal on Silicon (LCoS or LCOS), Digital Light Processing (DLP) or Liquid Chrystal Display (LCD) digital projection technology can be used instead of a pico-projector.

Example Memory Metrics

In general, the wearable multimedia device 101 can capture multimedia data of spontaneous moments and transactions with minimal interaction by the user. Further, the wearable multimedia device 101 can automatically edit and format the multimedia data on a cloud computing platform based on user preferences, and make the multimedia data available to the user for replay on a variety of user playback devices. In some implementations, the data editing and/or processing can be performed by an ecosystem of applications that are proprietary and/or provided/licensed from third party developers. Further, the application ecosystem can provide various access points (e.g., a website, portal, API) that allow the third party developers to upload, verify and update their applications. Further, the cloud computing platform can automatically build a custom processing pipeline for each multimedia data stream using one or more of the ecosystem applications, user preferences and other information (e.g., the type or format of the data, the quantity and quality of the data).

Additionally, the wearable multimedia device 101 can include one or more cameras and/or depth sensor configured to detect objects and/or gestures performed by the user (e.g., using the user's hands), and perform or infer various actions based on the detections. As an example, based on the detections, the wearable multimedia device can label objects in camera images, control the operation of the wearable multimedia device, and/or control the operation of other devices communicatively coupled to the wearable multimedia device. Example cameras and/or depth sensors include the camera/video subsystem 820 and biometric sensor(s) 812, as described with reference to FIG. 8.

Further, in some implementations, the wearable multimedia device does not include a display, thereby allowing the user to continue interacting with friends, family, and co-workers without being immersed in a display. As such, the wearable multimedia device takes a different technical approach than, for example, smart goggles or glasses for augmented reality (AR) and virtual reality (VR), where the user is further detached from the real-world environment. To facilitate collaboration with others and to compensate for no display, the wearable multimedia computer can include a laser projection system (e.g., a projector subsystem 832, as described with reference to FIG. 8) that projects a laser projection onto any surface, including tables, walls and even the user's palm. The laser projection can label objects, provide text or instructions related to the objects, and provide a virtual interface (VI) that allows the user to compose messages, control other devices, or simply share and discuss content with others.

For instance, the wearable device 101 can include a projector subsystem 832 configured to present information visually to a user in the form of projected light. As an example, the projector subsystem 832 can project light onto a surface (e.g., a surface of a user's hand, such as the user's palm) according to a particular spatial and/or temporal pattern, such that the user perceives a VI with one or more user interface elements. Further, the user can perform gestures to interact with the VI.

In some implementations, the wearable multimedia device 101 can generate multimedia data, estimate the importance of that multimedia data to one or more users, and store an indication of the estimated importance alongside the multimedia data (e.g., in the form of metadata).

As an example, the wearable multimedia device 101 can generate a content item having images, text, video, audio, or any combination thereof. Example processes for generating content items are described with reference to FIGS. 1-9.

Further, based on characteristics of the content item and/or a user (e.g., the user who was wearing the wearable multimedia device 101 during the generation of the content), the wearable multimedia device 101 can determine a metric representing an estimated importance of that content item to the user. In some implementations, the metric can represent, at least in part, an estimated strength of the user's memory with respect to the subject matter of the content item and/or the estimated degree of emotional impact of the subject matter of the content item to the user. In some implementations, the metric may be referred to as a "memory metric" or a "memory strength metric."

Figure 10:
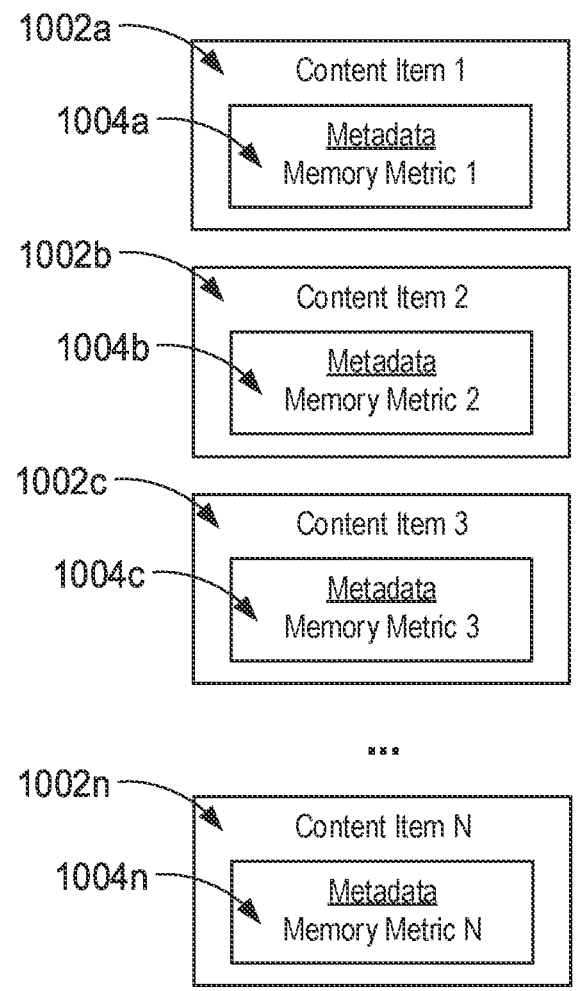
FIG. 10 is a diagram of example content items and metadata including a memory metric.

Further, the wearable multimedia device 101 can store the memory metric with the content item (e.g., as metadata of the content item). As an example, FIG. 10 shows several content items 1000a-1000n ("Content Item 1," . . . , "Content Item N"). Each of the content items 1000a-1000n can include images, text, video, audio, or any combination thereof. Further, each of the content items 1000a-1000n can include respective metadata 1002a-1002n that includes a respective memory metric for that content items 1000a-1000n.

In some implementations, at least some of the metadata 1002a-1002n can be stored as a part of the content items 1000a-1000n. For example, if a content item 1000a-1000n includes one or more files, the corresponding metadata 1002a-1002n can be included in the one or more files.

In some implementations, at least some of the metadata 1002a-1002n can be stored separately from the content items 1000a-1000n. For example, if a content item 1000a-1000n includes one or more files, the corresponding metadata 1002a-1002n can be stored using data structures (e.g., files, records, etc.) that are separate from the one or more files.

In general, the metadata 1002a-1002n can include additional information regarding the content items 1000a-1000n. As an example, the metadata 1002a-1002n can include the title, the abstract, and/or the author(s) of each of the content items 1000a-1000n. As another example, the metadata 1002a-1002n can include one or more keywords or labels associated with the content items 1000a-1000n. As another example, the metadata 1002a-1002n can include objects, people and/or locations that are the subject of the content items 1000a-1000n. As another example, the metadata 1002a-1002n can indicate the time and/or day in which the content items 1000a-1000n were generated, edited, and/or published. As another example, the metadata 1002a-1002n can indicate access permissions associated with the content items 1000a-1000n, such as an indication of the entities who are authorized to view, edit, and/or distribute the content items 1000a-1000n.

In some implementations, the memory metrics can be determined, at least in part, based on biometric data and/or location data. For example, the wearable multimedia device 101 can capture sensor data (e.g., from the camera/video subsystem 820, depth sensors(s) 814, microphone 828, etc.), and incorporate at least some of the sensor data into a content item. Further, concurrently with capturing of the sensor data, the wearable multimedia device 101 can capture biometric data regarding the user using one or more biometric sensor(s) 812. Example biometric data includes the user's heartrate, respiration rate, perspiration rate, body temperature, etc. Further, the wearable multimedia device can capture location data regarding the user using the location processor 815. Example location data includes the user's current location and/or historical locations. Based on the biometric data, the wearable multimedia device 101 can estimate an emotional state of the user during the capturing of the sensor data, and estimate the degree of importance of the subject matter of the content item to the user.

Figure 11:
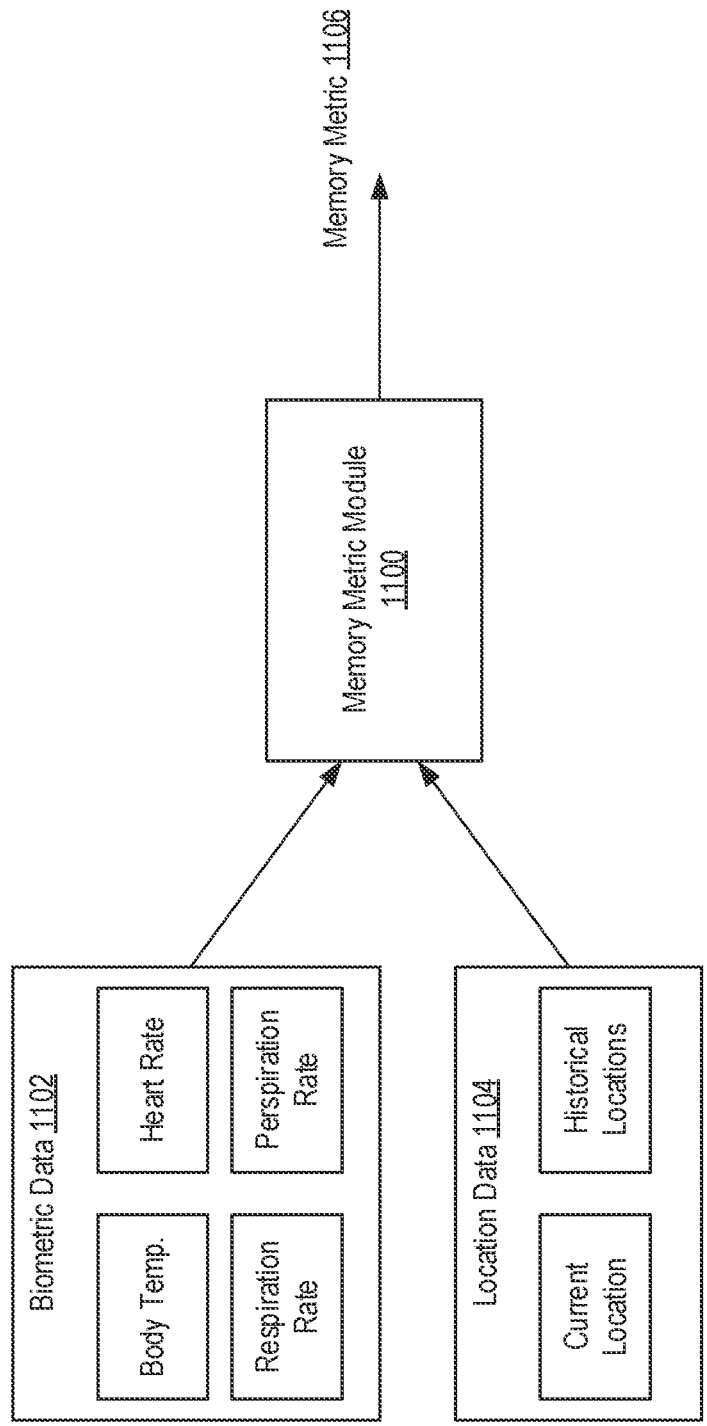
FIG. 11 is a diagram of an example memory metric module for determining memory metrics.

Referring to FIG. 11, the memory metrics can be determined using a memory metric module 1100. In some implementations, the memory metric module 1100 can be implemented, at least in part, as a component of the wearable multimedia device 101 (e.g., using one or more processors, circuitry, memory, data storage devices, etc.). In some implementations, the memory metric module 1100 can be implemented, at least in part, as a component remote from the wearable multimedia device 101 (e.g., using one or more cloud computing platforms).

During an example operation of the memory metric module 1100, the memory metric module 1100 receives biometric data 1102 and location data 1104, and generates a memory metric 1106 based on the biometric data 1102 and location data 1104. As described above, the memory metric 1106 can be stored as metadata for one or more content items.

In some implementations, the biometric data 1102 can include one or more body temperatures measurements regarding a user (e.g., the user wearing the wearable multimedia device 101). The body temperature measurements can be obtained, for example, using one or more temperature sensors (e.g., thermometers, thermocouples, etc.) that are secured to the user. In some implementations, the temperature sensors can be included as components of the wearable multimedia device 101. In some implementations, the temperature sensors can be components that are separate from and communicatively coupled to the wearable multimedia device 101 (e.g., using one or more wired and/or wireless network interfaces).

In some implementations, the biometric data 1102 can include one or more heart rate measurements regarding a user (e.g., the user wearing the wearable multimedia device 101). The heart rate measurements can be obtained, for example, using one or more heart rate sensors (e.g., electrocardiography (ECG or EKG) sensor, photoplethysmography (PPG) sensors, etc.) that are secured to the user. In some implementations, the heart rate sensors can be included as components of the wearable multimedia device 101. In some implementations, the heart rate sensors can be components that are separate from and communicatively coupled to the wearable multimedia device 101 (e.g., using one or more wired and/or wireless network interfaces).

In some implementations, the biometric data 1102 can include one or more respiration rate measurements regarding a user (e.g., the user wearing the wearable multimedia device 101). The respiration rate measurements can be obtained, for example, using one or more respiration sensors (e.g., respirometer, blood oxygen sensor, pulse oximeter, capnograph sensor, thoracic transducer belt monitoring system, etc.) that are secured to the user. In some implementations, the respiration sensors can be included as components of the wearable multimedia device 101. In some implementations, the respiration rate sensors can be components that are separate from and communicatively coupled to the wearable multimedia device 101 (e.g., using one or more wired and/or wireless network interfaces).

In some implementations, the biometric data 1102 can include one or more perspiration rate measurements regarding a user (e.g., the user wearing the wearable multimedia device 101). The perspiration rate measurements can be obtained, for example, using one or more perspiration sensors (e.g., capacitive and/or electrochemical sweat detecting sensors) that are secured to the user. In some implementations, the perspiration sensors can be included as components of the wearable multimedia device 101. In some implementations, the perspiration rate sensors can be components that are separate from and communicatively coupled to the wearable multimedia device 101 (e.g., using one or more wired and/or wireless network interfaces).

In some implementations, the biometric data 1102 can include measurements that are obtained concurrently with the sensor data that is used to generate multimedia content (e.g., video data, image data, audio data, depth data, etc.). For example, the wearable multimedia device 101 can obtain sensor data from the camera/video subsystems 820, environment sensor(s) 817, depth sensor(s) 814, etc., and use at least some of that sensor data to generate multimedia content. Further, concurrently with obtaining that sensor data, the wearable multimedia device 101 can also obtain biometric data regarding the user (e.g., to determine the user's physical and/or emotional state as she experiences the events around him).

In some implementations, the location data 1104 can include the current location of the user. For example, the wearable multimedia device 101 can obtain sensor data from the camera/video subsystems 820, environment sensor(s) 817, depth sensor(s) 814, etc., and use at least some of that sensor data to generate multimedia content. Further, concurrently with obtaining that sensor data, the wearable multimedia device 101 can also obtain location data indicating the location of the user at that time. In some implementations, the current location of the user can be determined using the location processor 815 (e.g., based on information obtained by a GNSS receiver).

In some implementations, the location data 1104 can include the historical locations of the user. For example, the location data 1104 can include information regarding each of the locations that the user has previously visited, the times and/or dates during which she visited each of those locations, and the frequency at which she visits each of those locations. In some implementations, the historical locations of the user can be determined using the location processor 815 (e.g., based on information obtained by a GNSS receiver during one or more times in the past).

The memory metric module 1100 determines a memory metric 1106 for one or more content items based on the biometric data 1102 and the location data 1104. For example, based on the biometric data 1102 and the location data 1104, the memory metric module 1100 can estimate the strength of the user's memory and/or the degree of emotional impact of the events occurring around her. Further, the memory metric module 1100 can generate a memory metric 1106 representing that estimate, and store the memory metric 1106 as metadata of a content item depicting those events.

In some implementations, the memory metric 1106 can be a numerical value. For example, a higher numerical value can indicate that the subject matter of a particular content item is estimated to have greater importance to the user and/or a greater emotional impact on the user. In contrast, a lower numerical value can indicate that the subject matter of a particular content item is estimated to have lesser importance to the user and/or a lesser emotional impact on the user.

In some implementations, the memory metric 1106 can vary depending on the body temperature of the user. For example, with all other measurements being equal, a higher body temperature can correspond to a memory metric having a greater value, whereas a lower body temperature can correspond to a memory metric having a lesser value.

In some implementations, the memory metric 1106 can vary depending on the heart rate of the user. For example, with all other measurements being equal, a higher heart rate can correspond to a memory metric having a greater value, whereas a lower heart rate can correspond to a memory metric having a lesser value.

In some implementations, the memory metric 1106 can vary depending on the respiration rate of the user. For example, with all other measurements being equal, a higher respiration rate can correspond to a memory metric having a greater value, whereas a lower respiration rate can correspond to a memory metric having a lesser value.

In some implementations, the memory metric 1106 can vary depending on the perspiration rate of the user. For example, with all other measurements being equal, a higher perspiration rate can correspond to a memory metric having a greater value, whereas a lower perspiration rate can correspond to a memory metric having a lesser value.

In some implementations, the memory metric 1106 can vary depending on the current location and/or historical locations of the user. For example, if the user's current location is a location that the user infrequently visits, a memory metric can have a greater value (e.g., the user is more likely to be having new experiences at that location, which may have a greater emotional impact on the user). As another example, if the user's current location is a location that the user frequently visits, a memory metric can have a lesser value (e.g., the user is less likely to be having new experiences at that location, which may have a lesser emotional impact on the user).

In some implementations, the memory metric module 1100 can calculate multiple sub-metrics (e.g., representing different respective aspects of the biometric data 1102 and/or location data 1104), and determine the memory metric 1106 based on the sub-metrics. As an example, memory metric module 1100 can calculate sub-metrics representing user's body temperature, heart rate, respiration rate, and/or perspiration rate, respectively. As another example, the memory metric module 110 can calculate a sub-metric representing a frequency at which the user has historically visited her current location. The memory metric module 110 can apply a weight to each sub-metric (e.g., a weighting coefficient value), determine a sum of the weighted sub-metrics, and use the sum as the memory metric 1106.

In some implementations, the weights for each sub-metric can be determined empirically. For example, a developer of the wearable multimedia device 101 can collect biometric data and/or location data regarding a user, and obtain feedback from a user regarding her emotional state at the time that the data was collected (e.g., feedback indicating the degree of importance and/or the emotional impact of the events that were occurring at the time that the data was collected). Based on this information, different weights can be selected for each of the sub-metrics, such that the weighted sum of the sub-metrics accurately reflects the estimated importance of a content item to a user, given certain biometric data and/or location data regarding the user at the time that the content item was generated.

Figure 12:
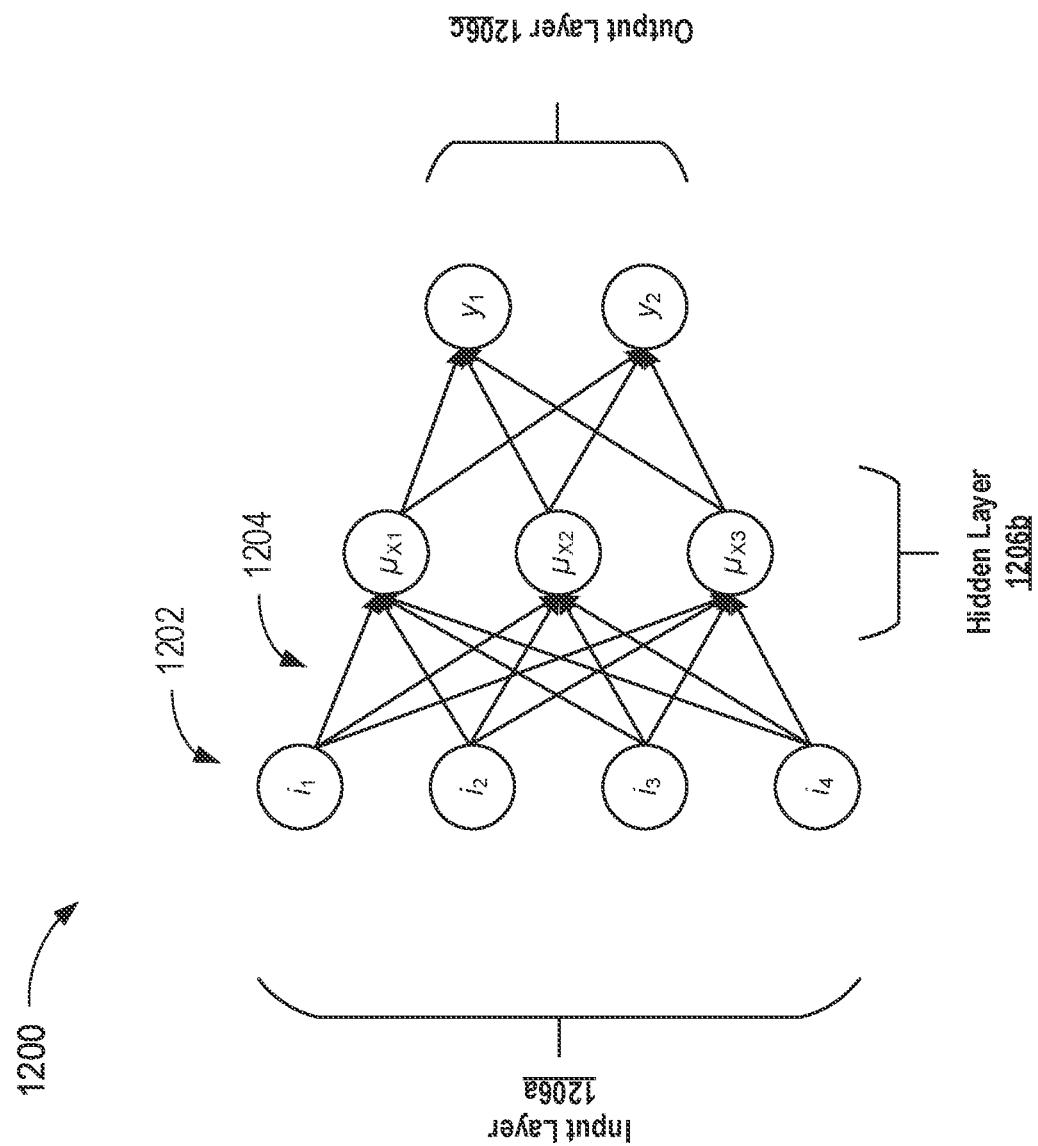
FIG. 12 is a diagram of an example neural network.

In some implementations, the weights can be selected, at least in part, using a machine learning process, such as a machine learning process performing using one or more neural networks. A simplified example of a neural network 1200 is shown in FIG. 12.

The neural network 1200 includes several nodes 1202 (often called "neurons") interconnected with another by interconnections 1204. Further, the nodes 1202 are arranged according to multiple layers, including an input layer 1206a, a hidden layer 1206b, and an output layer 1206c. The arrangement of the nodes 1202 and the interconnections 1204 between them represent a mathematical transformation of input data (e.g., as received by the nodes of the input layer 1206a) into corresponding output data (e.g., as output by the nodes of the output layer 1206c). In some implementations, the input data can represent one or more data points obtained by the memory metric module 1100 (e.g., biometric data 1102 and/or location data 1104), and the output data can represent one or more corresponding memory metrics 1106 generated by the memory metric module 1100 based on the input data.

The nodes 1202 of the input layer 1206a receive input values and output the received input values to respective nodes of the next layer of the neural network 1200. In this example, the neural network 1200 includes several inputs $i_1$, $i_2$, $i_3$, and $i_4$, each of which receives a respective input value and outputs the received value to one or more of the nodes $\mu_{x1}$, $\mu_{x2}$, and $\mu_{x3}$ (e.g., as indicated by the interconnections 1204).

In some implementations, at least some of the biometric data 1102 and/or location data 1104 can be used as inputs for the nodes of the input layer 1206a. For example, at least some of the biometric data 1102 and/or location data 1104 can be expressed numerically (e.g., assigned a numerical score or value), and input into the nodes of the input layer 1206a. For example, the user's body temperature, heart rate, respiration rate, and/or perspiration rate can be expressly numerically, and input into the nodes of the input layer 1206a. As another example, the frequency by which the user has visited her current location can be input into the nodes of the input layer 1206a.

The nodes of the hidden layer 1206b receive input values (e.g., from the nodes of the input layer 1206a or nodes of other hidden layers), applies particular transformations to the received values, and outputs the transformed values to respective nodes of the next layer of the neural network 1200 (e.g., as indicated by the interconnections 1204). In this example, the neural network 1200 includes several nodes $\mu_{x1}$, $\mu_{x2}$, and $\mu_{x3}$, each of which receives respective input values from the nodes $ii_1$, $i_2$, $i_3$, and $i_4$, applies a respective transformation to the received values, and outputs the transformed values to one or more of the nodes $y_1$ and $y_2$.

In some implementations, nodes of the hidden layer 1206b can receive one or more input values, and transform the one or more received values according to a mathematical transfer function. As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, a transfer function can weight certain inputs differently than others, such that certain inputs have a greater influence on the output of the node than others. For example, in some implementations, a transfer function can weight each of the inputs by multiplying each of the inputs by a respective coefficient. Further, in some implementations, a transfer function can apply a bias to its output. For example, in some implementations, a transfer function can bias its output by a particular offset value.

For instance, a transfer function of a particular node can be represented as:

$$Y = \sum_{i=1}^{n}(\text{weight}_i * \text{input}_i) + \text{bias},$$

where $\text{weight}_i$ is the weight that is applied to an input $\text{input}_i$, bias is a bias or offset value is that is applied to the sum of the weighted inputs, and Y is the output of the node.

The nodes of the output layer 1206*c* receive input values (e.g., from the nodes of the hidden layer 1206*b*) and output the received values. In some implementations, nodes of the output layer 1206*c* can also receive one or more input values, and transform the one or more received values according to a mathematical transfer function (e.g., in a similar manner as the nodes of the hidden layer 1206*b*). As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, at least one of the nodes of the output layer 1206*c* can correspond to a memory metric for a particular content item. As an example, as described above, a memory metric having a high value can indicate that a particular content item is more likely to be of importance to the user, whereas a memory metric having a low value can indicate that a particular content item is less likely to be of importance to the user.

In this example, the neural network 1200 includes two output nodes $y_1$ and $y_2$, each of which receives respective input values from the nodes $\mu_{x1}$, $\mu_{x2}$, and $\mu_{x3}$, applies a respective transformation to the received values, and outputs the transformed values as outputs of the neural network 1200.

Although FIG. 12 shows example nodes and example interconnections between them, this is merely an illustrative example. In practice, a neural network can include any number of nodes that are interconnected according to any arrangement. Further, although FIG. 12 shows a neural network 1200 having a single hidden layer 1206*b*, in practice, a network can include any number of hidden layers (for example, one, two, three, four, or more), or none at all.

Figure 13:
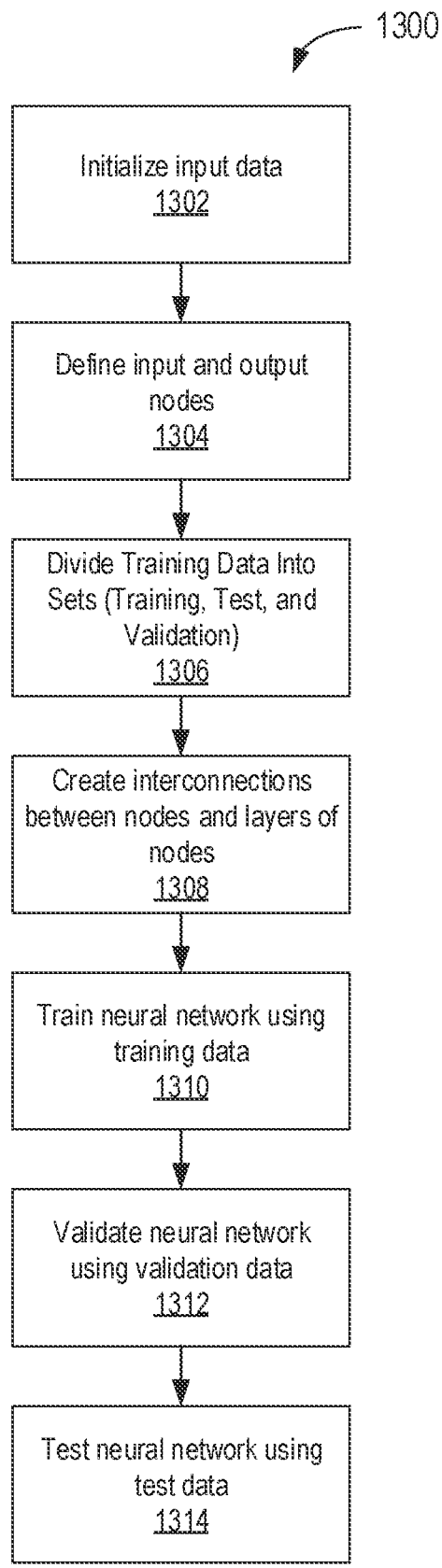
FIG. 13 is a diagram of an example process for training a neural network.

In some implementations, the neural network 1200 can be trained based on training data. An example process 1300 for training the neural network 1200 is shown in FIG. 13.

According to the process 1300, the memory metric module 1100 initializes the input data that is used to train the neural network 1200 (block 1302). As an example, the memory metric module 1100 can retrieve training data including sets of biometric data regarding one or more users, location data regarding the one or more users, and/or feedback from the one or more users regarding their emotional state at the time that the data was collected.

Further, the memory metric module 1100 defines the input and the output nodes of the neural network 1200 (block 1304). For example, the memory metric module 1100 can select one or more of the types of data included in the training data, and specify that they be used as respective input nodes in the neural network 1200 (e.g., as inputs for respective nodes of the input layer 1206*a*). As another example, the memory metric module 1100 can specify each of the outputs of the neural network (e.g., the outputs of each of the nodes of the output layer 1206*c*). For instance, at least one of the nodes of the output layer 1206*c* can correspond to a memory metric regarding a content item.

The memory metric module 1100 divides the training data into different sets (block 1306). For example, the training data can be divided into a training set, a validation set, and a test set.

The training set can be used to train the neural network 1200. For example, the training set can be used to identify patterns, trends, or correlations between the inputs and the outputs of the neural network 1200, and to express those relationships using the nodes and interconnections between them.

The validation set can be used to tune the performance of the trained neural network 1200. For example, the validation set can be used to determine a difference between the output of the neural network 1200 given certain inputs, and an expected output. The configuration of the neural network can be modified based on the difference (e.g., such that the output of the neural network 1200 better matches the expected result).

The test set can be used to evaluate the performance of the trained neural network 1200 (for instance, after it has been tuned based on the validation set). For example, the test set can be used to determine a difference between the output of the neural network 1200 given certain inputs, and an expected output. This difference can indicate the ability of the neural network 1200 to accurately predict a particular outcome (e.g., the importance of a content item to a user) given particular inputs (e.g., biometric data and/or location data regarding the user).

Further, the memory metric module 1100 creates interconnections between the nodes and layers of nodes in the neural network 1200 (block 1308). In some implementations, an interconnection between two or more nodes can be in the forward direction (e.g., data can be passed between nodes in the direction of the input to the output of the neural network 1200). This may be referred to as a "feed forward" interconnection. In some implementations, an interconnection between two or more nodes can be in the backward direction (e.g., data can be passed between nodes in the direction of the output to the input of the neural network 1200). This may be referred to as a "back propagation" interconnection.

Further, the memory metric module 1100 creates layers of nodes. For example, the memory metric module 1100 can specify that the neural network include N layers of nodes, such as one input layer, one output layer, and N−2 hidden layers. Other arrangements of layers are also possible, depending on the implementation.

Further, the memory metric module 1100 trains the neural network 1200 using the training set (block 1310). In some implementations, the memory metric module 1100 can perform the training based on a supervised learning method. As an example, the training set can include example input data and output data. Based on the arrangement of the nodes and the interconnections between them, the memory metric module 1100 can identify transfer functions for each of the nodes that would result in the output of the neural network 1200 matching or otherwise being similar to the output data in the training set, given the same input data. In some implementations, the memory metric module 1100 can select particular weights or biases for each of the transfer functions. In some implementations, this can be performed iteratively (e.g., using successive sets of training data).

After training the neural network 1200, the memory metric module 1100 validates the neural network 1200 using the validation set (block 1312). As an example, the validation set can include example input data and output data. The memory metric module 1100 can input the input data into the neural network 1200, and compare the output of the neural network 1200 to the output data of the validation set. In some implementations, the memory metric module 1100 can calculate an "error" of the neural network 1200, such as the difference between the output data of the validation set and the output of the neural network 1200.

In some implementations, the memory metric module 1100 can tune the neural network 1200 based on the validation set. For example, the memory metric module 1100 can modify the arrangement of the nodes, the interconnections between them, and/or the transfer functions (e.g., the weights and biases) such that the error of the neural network 1200 is reduced.

In some implementations, this can be performed iteratively (e.g., using successive sets of validation data) until particular criteria are met. For example, in some implementations, the memory metric module 1100 can iteratively tune the neural network 1200 until the error of the neural network 1200 is less than a particular threshold value. As another example, the memory metric module 1100 can iteratively tune the neural network 1200 until the neural network 1200 exhibits a sufficiently low false positive rate (e.g., the rate in which it predicts that a content item is important to a user, when in fact the content item is not important to a user) and/or a sufficiently low false negative rate (e.g., the rate in which it predicts that a content item is not important to a user, when in fact the content item is important to a user).

After training and tuning the neural network 1200, the memory metric module 1100 tests the neural network 1200 using the test set (block 1314). As an example, the test set can include example input data and output data. The memory metric module 1100 can input the input data into the neural network 1200, and compare the output of the neural network 1200 to the output data of the test set. In some implementations, the memory metric module 1100 can calculate an "error" of the neural network 1200, such as the difference between the output data of the test set and the output of the neural network 1200. This error can represent the predictive performance of the neural network 1200. For example, a high error can indicate that the neural network 1200 is not likely to predict an outcome accurately, given certain input data. Conversely, lower error can indicate that the neural network 1200 is likely to predict an outcome accurately, given certain input data.

In some implementations, the wearable multimedia device 101 can use the memory metric when subsequently presenting the content item to the user. As an example, when presenting content to a user, the wearable multimedia device 101 can prioritize the presentation of content items having a higher metric (e.g., indicating that those content items are more likely to be of importance to the user), and deprioritize the presentation of content items having a lower metric (e.g., indicating that those content items are less likely to be of importance to the user).

The implementations described herein can provide various technical benefits. For instance, these techniques allow a wearable multimedia device 101 to identify content items that are more likely to be relevant to a user (e.g., content items having subject matter that is of greater importance to the user and/or having a greater emotional impact on the user), and prioritize the presentation of those content items to the user over other content items. Accordingly, the user is less likely to browse through other content items (e.g., content items having subject matter that is of lesser importance to the user and/or having a lesser emotional impact on the user) when searching for content items of interest.

Further, these techniques can reduce the resources expended by the wearable multimedia device 101 during operation. For instance, absent these techniques, a user may have difficulty identifying content items of interest, and may interact with the wearable multimedia device 101 for an extended period of time while performing a search for relevant content items. Thus, the wearable multimedia device 101 may expend resources—such as computational resources (e.g., CPU cycles), memory resources, storage resources, network resources, and/or battery resources—that might otherwise not need to be expended. By prioritizing the presentation of certain content items over others (e.g., in accordance with one or more memory metrics), the wearable multimedia device 101 can reduce the expenditure of resources and operate in a more efficient manner.

In some implementations, the wearable multimedia device 101 can arrange content items in a sequence in accordance with their memory metrics, and present the sequence of content items to the user. As an illustrative example, FIG. 14A shows four content items 1402*a*-1402*d* ("Content Item 1," . . . , "Content Item 4," respectively), each having respective metadata 1404*a*-1404*d* that includes a memory metric. In this example, a user 1406 instructs the wearable multimedia device 101 to present content (e.g., by speaking a command, such as "Show me content"). In response, the wearable multimedia device 101 arranges the content items 1402*a*-1402*d* in a sequence (e.g., from the content item having the highest valued memory metric to the content item having the lowest valued memory metric), and presents the sequence of content items 1402*a*-1042*d* to the user 1406.

In some implementations, the wearable multimedia device 101 can select the N content item(s) having the highest valued memory metrics, and present the selected content item(s) to the user. As an illustrative example, FIG. 14B shows four content items 1412*a*-1412*d* ("Content Item 1," . . . , "Content Item 4," respectively), each having respective metadata 1414*a*-1414*d* that includes a memory metric. In this example, a user 1406 instructs the wearable multimedia device 101 to present content (e.g., by speaking a command, such as "Show me content"). In response, the wearable multimedia device 101 selects the N content items 1412*a*-1412*d* having the highest valued memory metrics, and presents those content item(s) to the user. In this example, N=1. Accordingly, the wearable multimedia device 101 selects the content item 1412*b* ("Content Item 2"), which has the highest valued memory metric from among the content items 1412*a*-1412*d*, and presents the content item 1412*b* to the user 1406. In practice, the value of N can vary, depending on the implementation. In some implementations, a user can specify the value of N.

Figure 14C:
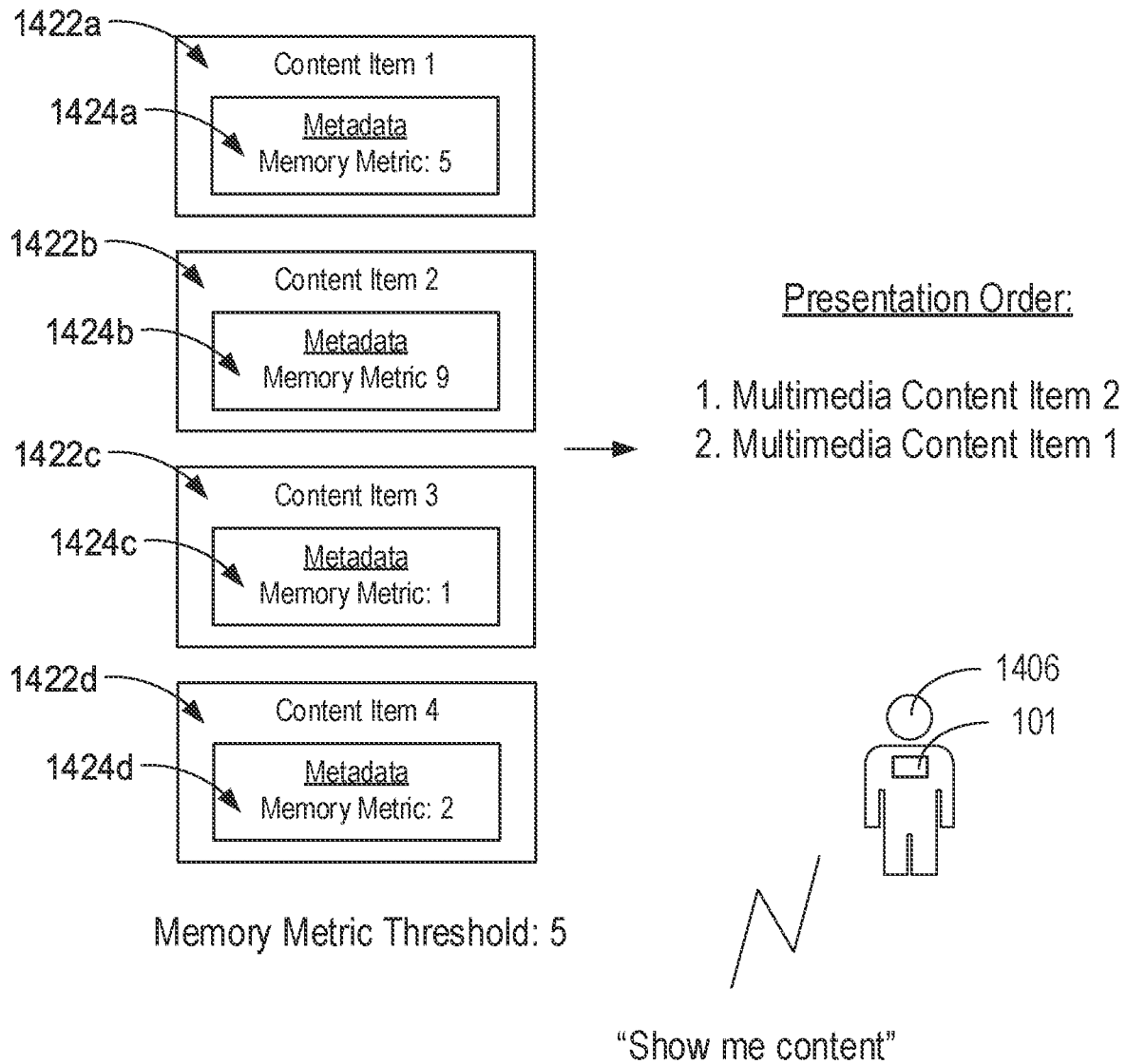

In some implementations, the wearable multimedia device 101 can select the content item(s) having memory metrics that are greater than or equal to a particular threshold value, and present those content item(s) to the user. As an illustrative example, FIG. 14C shows four content items 1422*a*-1422*d* ("Content Item 1," . . . , "Content Item 4," respectively), each having respective metadata 1424*a*-1424*d* that includes a memory metric. In this example, a user 1406 instructs the wearable multimedia device 101 to present content (e.g., by speaking a command, such as "Show me content"). In response, the wearable multimedia device 101 selects the content items 1412*a*-142*d* that exceed a threshold value, and presents those content item(s) to the user. In this example, the threshold value is 5. Accordingly, the wearable multimedia device 101 selects the content items 1422*a* ("Content Item 1") and 1422*b* ("Content Item 2"), which have memory metrics that are greater than or equal to 5, and presents the content items 1422*a* and 1422*b* to the user 1406. In practice, the threshold value can vary, depending on the implementation. In some implementations, a user can specify the threshold value.

Figure 15A:
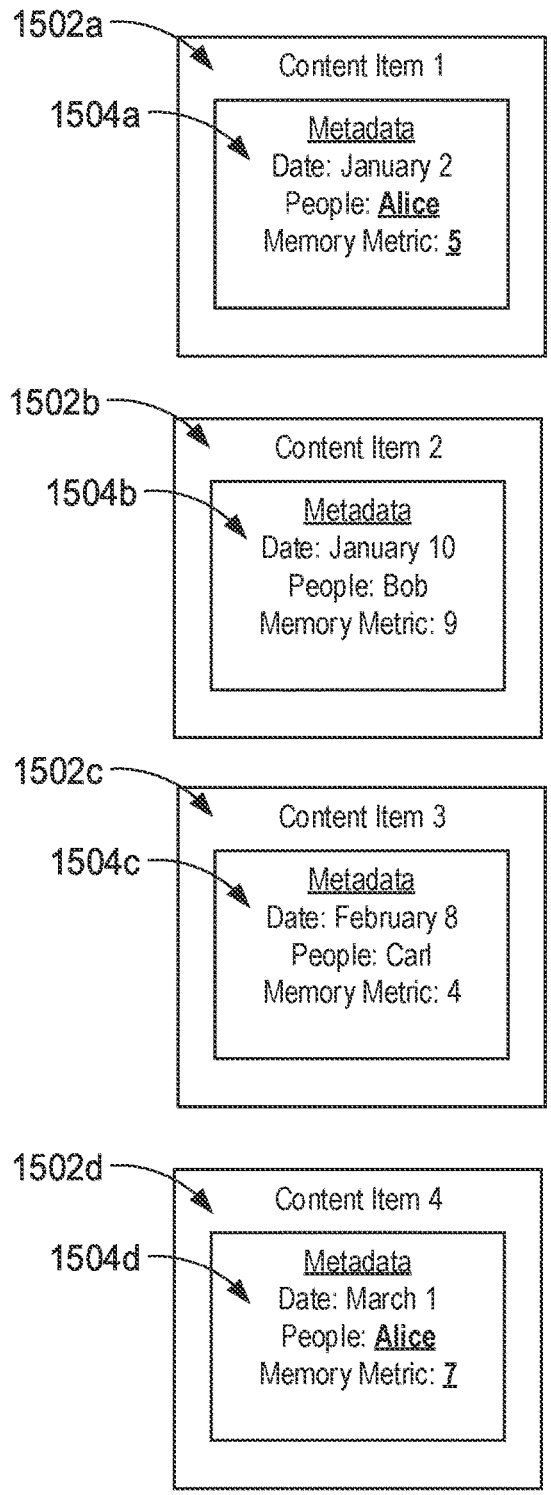
FIGS. 15A and 15B are diagrams of further example operations performed by a wearable multimedia device.

In some implementations, a user can instruct the wearable multimedia device 101 to present content that satisfies a set of search criteria. In response, the wearable multimedia device 101 can identify the content items that satisfy the set of search criteria, arrange those content items in a sequence in accordance with their memory metrics, and present the sequence of content items to the user. As an illustrative example, FIG. 15A shows four content items 1502a-1502d ("Content Item 1," . . . , "Content Item 4," respectively), each having respective metadata 1504a-1504d. In this example, the metadata 1504a-1504d indicates a memory metric for each of the content items 1502a-1502d. Further, the metadata 1504a-1504d indicates a date associated with each of the content items 1502a-1502d (e.g., the date at which the subject matter of the content item was recorded or captured), and the people who are depicted in each of the content items 1502a-1502d. Further, in this example, a user 1406 instructs the wearable multimedia device 101 to present content satisfying a set of search criteria (e.g., by speaking a command, such as "Show me content with Alice"). In response, the wearable multimedia device 101 identifies the content items satisfying the set criteria, arranges those content items in a sequence in accordance with their memory metrics, and presents the sequence of content items to the user. For example, the content item 1502a ("Content Item 1") and the content item 1502d ("Content Item 4") each depict Alice. Accordingly, the wearable multimedia device 101 arranges the content items 1502a and 1502d in a sequence (e.g., from the content item having the highest valued memory metric to the content item having the lowest valued memory metric), and presents the sequence of content items to the user 1406.

Figure 15B:
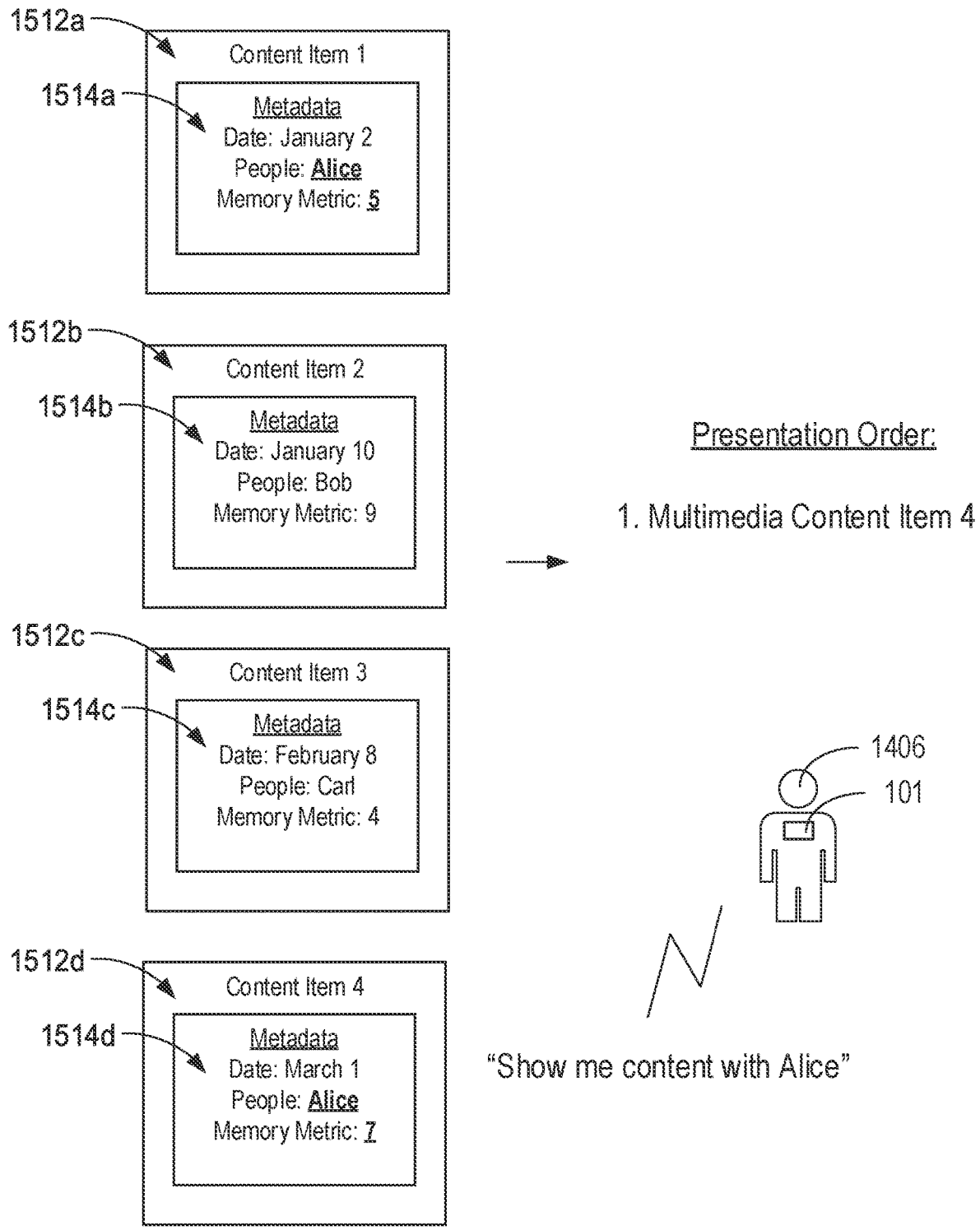

In some implementations, a user can instruct the wearable multimedia device 101 to present content that satisfies a set of search criteria. In response, the wearable multimedia device 101 can identify the content items that satisfy the set of search criteria, select N of those content item(s) having the highest valued memory metrics, and present the selected content item(s) to the user. As an illustrative example, FIG. 15B shows four content items 1512a-1512d ("Content Item 1," . . . , "Content Item 4," respectively), each having respective metadata 1514a-1514d. In this example, the metadata 1514a-1514d indicates a memory metric for each of the content items 1512a-1512d. Further, the metadata 1514a-1514d indicates a date associated with each of the content items 1512a-1512d (e.g., the date at which the subject matter of the content item was recorded or captured), and the people who are depicted in each of the content items 1512a-1512d. Further, in this example, a user 1406 instructs the wearable multimedia device 101 to present content satisfying a set of search criteria (e.g., by speaking a command, such as "Show me content with Alice"). In response, the wearable multimedia device 101 identifies the content items satisfying the set criteria, selects N of those content item(s) having the highest valued memory metrics, and presents the selected content item(s) to the user. In this example, N=1. Accordingly, the wearable multimedia device 101 selects the content item 1512d ("Content Item 2") (e.g., the content item having the highest memory metric, from among the content items that depict Alice), and presents the content item 1512d to the user 1406. In practice, the value of N can vary, depending on the implementation. In some implementations, a user can specify the value of N.

As described above, a wearable multimedia device can capture sensor data (e.g., to generate one or more content items), and concurrently with capturing of the sensor data, capture biometric data regarding a user (e.g., to determine one or more memory metrics for those content items). However, in practice, a wearable multimedia device can capture sensor data prior to, concurrently with, and/or subsequent to capturing biometric data. As an example, a wearable multimedia device can initially capture sensor data (e.g., to generate one or more content items), and subsequently capture biometric data regarding a user (e.g., to determine one or more memory metrics for those content items). As another example, a wearable multimedia device can initially capture biometric data, subsequently capture sensor data (e.g., to generate one or more content items), and determine one or more memory metrics for the content item based on the previously captured biometric data.

Additional Example Processes

Figure 16:
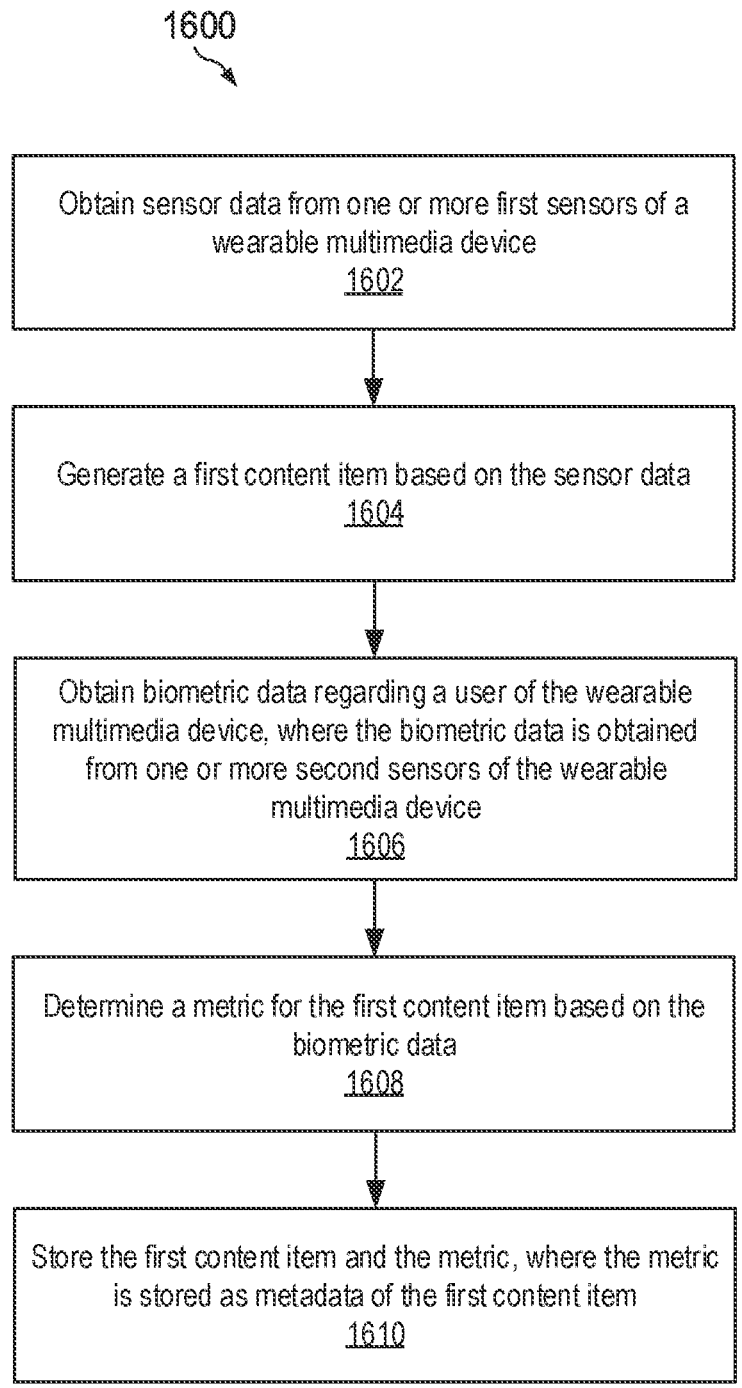
FIG. 16 is flow diagram of a process for generating, storing, and/or presenting content, according to an embodiment.

FIG. 16 is a flow diagram of an example process 1600 for processing multimedia content, according to an embodiment. Process 1600 can be implemented using wearable multimedia devices 101 described in reference to FIGS. 1-9.

According to the process 1600, a wearable multimedia device obtains sensor data from one or more first sensors of the wearable multimedia device (block 1602). In some implementations, the one or more first sensors can include a camera of the wearable multimedia device, a microphone of the wearable multimedia device, and/or a depth sensor of the wearable multimedia device.

Further, the wearable multimedia device generates a first content item based on the sensor data (block 1604). In some implementations, the first content item can include video and/or audio.

Further, the wearable multimedia device obtains biometric data regarding a user of the wearable multimedia device (block 1606). The biometric data is obtained from one or more second sensors of the wearable multimedia device.

Further, the wearable multimedia device determines a metric for the first content item based on the biometric data (block 1608). In some implementations, the metric can represent a degree of importance of the first multimedia content item to the user.

In some implementations, the biometric data can include a plurality of types of data. Further, the metric for the first content item can be determined, at least in part, by determining, for each of the types of data, a corresponding score, and determining the metric based on a weighted sum of the scores.

In some implementations, the types of data can include a body temperature of the user, a heart rate of the user, a respiration rate of the user, and/or a perspiration rate of the user. In some implementations, the metric can increase with an increase in the body temperature of the user. In some implementations, the metric can increase with an increase in the heart rate of the user. In some implementations, the metric can increase with an increase in the respiration rate of the user. In some implementations, the metric can increase with an increase in the perspiration rate of the user.

Further, the wearable multimedia device stores the first content item and the metric (block 1610). The metric is stored as metadata of the first content item.

In some implementations, at least a portion of the sensor data can be obtained concurrently with the biometric data. In some implementations, at least a portion of the sensor data can be obtained prior to the biometric data. In some implementations, at least a portion of the sensor data can be obtained subsequent to the biometric data.

In some implementations, the wearable multimedia device can obtain first location data representing a current location of the user of the wearable multimedia device, and second location data representing a travel history of the user of the wearable multimedia device. Further, the wearable multimedia device can determine, based on the first location data and the second location data, a frequency metric representing a frequency at which the user has traveled to the current location. The metric for the first content item can be determined further based on the frequency metric. In some implementations, the metric can increase with a decrease in the frequency metric.

In some implementations, the wearable multimedia device can obtain a plurality of content items including the first content item. Each of the content items can include a respective metric stored as metadata. Further, the wearable multimedia device can filter the plurality of content items based on the metrics; and present at least some of the plurality of content items to the user based on the filtering.

In some implementations, the wearable multimedia device can receive, from the user, a request for presentation of one or more of the plurality of content items. The request can include one or more search criteria. Further, the wearable multimedia device can filter the plurality of content items based on the one or more search criteria.

In some implementations, the plurality of content items can be filtered, at least in part, by determining a first subset of the content items having metrics that exceed a threshold value, and determining a second subset of the content items having metrics that do not exceed the threshold value. Further, the first subset of the content items can be presented to the user. Further, the wearable multimedia device can refrain from presenting the second subset of the content items to the user.

In some implementations, the plurality of content items can be filtered, at least in part, by ranking the plurality of content items based on the metrics. Further, at least some of the plurality of content items can be presented in a sequence. The sequence can be determined based on the ranking of the plurality of content items.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A method comprising:
   obtaining, by one or more processors, sensor data from one or more first sensors of an electronic device, wherein the sensor data represents an environment of a user of the electronic device;
   generating, by the one or more processors, a first content item based on the sensor data, wherein the first content item comprises a depiction of the environment generated based on at least a portion of the sensor data;

obtaining, by the one or more processors, biometric data regarding the user, wherein the biometric data is obtained from one or more second sensors of the electronic device, and wherein at least a portion of the sensor data is obtained concurrently with the biometric data;

determining, by the one or more processors, a metric for the first content item based on the biometric data; and storing, by the one or more processors, the first content item and the metric, wherein the metric is stored as metadata of the first content item, and wherein the metric represents a degree of importance of the first content item including the depiction of the environment to the user.

2. The method of claim 1, wherein the one or more first sensors comprise at least one of:
a camera,
a microphone, or
a depth sensor.

3. The method of claim 1, wherein the biometric data comprises a plurality of types of data, and wherein determining the metric for the first content item comprises:
determining, for each of the types of data, a corresponding score, and
determining the metric based on a weighted sum of the scores.

4. The method of claim 3, wherein the types of data comprise at least one of:
a body temperature of the user,
a heart rate of the user,
a respiration rate of the user, or
a perspiration rate of the user.

5. The method of claim 1, wherein at least a portion of the sensor data is obtained prior to the biometric data.

6. The method of claim 1, wherein at least a portion of the sensor data is obtained subsequent to the biometric data.

7. The method of claim 1, further comprising:
obtaining first location data representing a current location of the user, wherein at least some of the sensor data is obtained while the user is at the current location;
obtaining second location data representing a travel history of the user; and
determining, based on the first location data and the second location data, a frequency metric representing a frequency at which the user has traveled to the current location,
wherein the metric for the first content item is determined further based on the frequency metric.

8. The method of claim 7, wherein the metric increases with a decrease in the frequency metric.

9. The method of claim 1, wherein the metric is determined based on a machine learning process having at least the biometric data as an input.

10. The method of claim 1, wherein the metric is determined using a neural network having at least the biometric data as an input.

11. The method of claim 1, further comprising:
obtaining a plurality of content items including the first content item, wherein each of the content items comprises a respective metric stored as metadata;
filtering the plurality of content items based on the metrics; and
presenting at least some of the plurality of content items to the user based on the filtering.

12. The method of claim 11, further comprising:
receiving, from the user, a request for presentation of one or more of the plurality of content items, wherein the request comprises one or more search criteria, and
wherein the plurality of content items are filtered further based on the one or more search criteria.

13. The method of claim 11, wherein filtering the plurality of content items comprises:
determining a first subset of the content items having metrics that exceed a threshold value, and
determining a second subset of the content items having metrics that do not exceed the threshold value.

14. The method of claim 13, wherein presenting at least some of the plurality of content items to the user comprises:
presenting the first subset of the content items to the user, and
refraining from presenting the second subset of the content items to the user.

15. The method of claim 11, wherein filtering the plurality of content items comprises:
ranking the plurality of content items based on the metrics.

16. The method of claim 15, wherein presenting at least some of the plurality of content items to the user comprises:
presenting at least some of the plurality of content items in a sequence, wherein the sequence is determined based on the ranking of the plurality of content items.

17. The method of claim 1, wherein at least some of the one or more processors are included in the electronic device.

18. The method of claim 1, wherein at least some of the one or more processors are remote from the electronic device.

19. A system comprising:
one or more processors; and
memory storing instructions that, when executed by the one or more processors, cause the one or more processors to perform operations comprising:
obtaining sensor data from one or more first sensors of an electronic device, wherein the sensor data represents an environment of a user of the electronic device;
generating a first content item based on the sensor data, wherein the first content item comprises a depiction of the environment generated based on at least a portion of the sensor data;
obtaining biometric data regarding the user, wherein the biometric data is obtained from one or more second sensors of the electronic device, and wherein at least a portion of the sensor data is obtained concurrently with the biometric data;
determining a metric for the first content item based on the biometric data; and
storing the first content item and the metric, wherein the metric is stored as metadata of the first content item, and wherein the metric represents a degree of importance of the first content item including the depiction of the environment to the user.

20. One or more non-transitory computer-readable media storing instructions that, when executed by at least one processor, cause the at least one processor to perform operations comprising:
obtaining sensor data from one or more first sensors of an electronic device, wherein the sensor data represents an environment of a user of the electronic device;
generating a first content item based on the sensor data, wherein the first content item comprises a depiction of the environment generated based on at least a portion of the sensor data;

obtaining biometric data regarding the user, wherein the biometric data is obtained from one or more second sensors of the electronic device, and wherein at least a portion of the sensor data is obtained concurrently with the biometric data;

determining a metric for the first content item based on the biometric data; and storing the first content item and the metric, wherein the metric is stored as metadata of the first content item, and wherein the metric represents a degree of importance of the first content item including the depiction of the environment to the user.

* * * * *